(12) United States Patent
Choi et al.

(10) Patent No.: US 11,260,351 B2
(45) Date of Patent: Mar. 1, 2022

(54) THIN FILM COMPOSITE HOLLOW FIBER MEMBRANES FABRICATION SYSTEMS

(71) Applicant: Saudi Arabian Oil Company, Dhahran (SA)

(72) Inventors: Seung-Hak Choi, Dhahran (KR); Melhan M. Ben Sultan, Dhahran (SA); Halah A. Shaikh Sulaiman, Dhahran (SA); Abdulrahman A. Alsuwailem, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 77 days.

(21) Appl. No.: 16/791,986

(22) Filed: Feb. 14, 2020

(65) Prior Publication Data

US 2021/0252460 A1    Aug. 19, 2021

(51) Int. Cl.
*B01D 67/00* (2006.01)
*B01D 69/08* (2006.01)
*B01D 69/12* (2006.01)

(52) U.S. Cl.
CPC ......... *B01D 69/12* (2013.01); *B01D 67/0013* (2013.01); *B01D 67/0095* (2013.01); *B01D 69/08* (2013.01); *B01D 2323/42* (2013.01)

(58) Field of Classification Search
CPC . B01D 67/0095; B01D 69/08; B01D 2323/42
See application file for complete search history.

(56) References Cited

U.S. PATENT DOCUMENTS

| 880,404 | A | 2/1908 | Sanford |
|---|---|---|---|
| 1,591,264 | A | 7/1926 | Baash |
| 1,789,993 | A | 1/1931 | Switzer |
| 1,896,482 | A | 2/1933 | Crowell |
| 1,949,498 | A | 3/1934 | Frederick et al. |

(Continued)

FOREIGN PATENT DOCUMENTS

| AU | 636642 | 5/1993 |
|---|---|---|
| AU | 2007249417 | 11/2007 |

(Continued)

OTHER PUBLICATIONS

Kurashina, Masaki—JP-2008161755-A Machine Translation—Jul. 2008 (Year: 2008).*

(Continued)

*Primary Examiner* — Bradley R Spies
(74) *Attorney, Agent, or Firm* — Fish & Richardson P.C.

(57) ABSTRACT

Apparatuses and methods for fabricating thin film composite hollow fiber membranes. In some implementations, an apparatus is used to remove excess first solution from a hollow fiber that has been immersed in a first solution. In some implementations, the method and apparatuses include flowing a gas, for example, compressed gas or ambient air, past a surface of a hollow fiber that has been immersed in a first solution prior to immersion in a second solution. In some implementations, the gas is flowed past the surface under positive pressure, while in other implementations the gas is flowed under negative pressure, for example, vacuum. The apparatuses and devices can be used to produce thin film composite hollow fiber membranes without pressing or damaging the hollow fiber.

16 Claims, 15 Drawing Sheets

(56) References Cited

U.S. PATENT DOCUMENTS

| | | |
|---|---|---|
| 2,121,002 A | 6/1938 | Baker |
| 2,121,051 A | 6/1938 | Ragan et al. |
| 2,187,487 A | 1/1940 | Burt |
| 2,189,697 A | 2/1940 | Baker |
| 2,222,233 A | 11/1940 | Mize |
| 2,286,075 A | 6/1942 | Evans |
| 2,304,793 A | 12/1942 | Bodine |
| 2,316,402 A | 4/1943 | Canon |
| 2,327,092 A | 8/1943 | Botkin |
| 2,411,260 A | 11/1946 | Glover et al. |
| 2,546,978 A | 4/1951 | Collins et al. |
| 2,672,199 A | 3/1954 | McKenna |
| 2,707,998 A | 5/1955 | Baker et al. |
| 2,728,599 A | 12/1955 | Moore |
| 2,751,010 A | 6/1956 | Trahan |
| 2,881,838 A | 4/1959 | Morse et al. |
| 2,912,053 A | 11/1959 | Bruekelman |
| 2,912,273 A | 11/1959 | Chadderdon et al. |
| 2,915,127 A | 12/1959 | Abendroth |
| 2,965,175 A | 12/1960 | Ransom |
| 2,965,177 A | 12/1960 | Le Bus et al. |
| 3,116,799 A | 1/1964 | Lemons |
| 3,147,536 A | 9/1964 | Lamphere |
| 3,225,828 A | 12/1965 | Wisenbaker et al. |
| 3,369,603 A | 2/1968 | Trantham |
| 3,381,748 A | 5/1968 | Peters et al. |
| 3,382,925 A | 5/1968 | Jennings |
| 3,667,721 A | 6/1972 | Vujasinovic |
| 3,897,038 A | 7/1975 | Le Rouax |
| 3,915,426 A | 10/1975 | Le Rouax |
| 4,030,354 A | 6/1977 | Scott |
| 4,042,019 A | 8/1977 | Henning |
| 4,059,155 A | 11/1977 | Greer |
| 4,099,699 A | 7/1978 | Allen |
| 4,190,112 A | 2/1980 | Davis |
| 4,254,983 A | 3/1981 | Harris |
| 4,276,931 A | 7/1981 | Murray |
| 4,296,822 A | 10/1981 | Ormsby |
| 4,349,071 A | 9/1982 | Fish |
| 4,391,326 A | 7/1983 | Greenlee |
| 4,407,367 A | 10/1983 | Kydd |
| 4,412,130 A | 10/1983 | Winters |
| 4,413,642 A | 11/1983 | Smith et al. |
| 4,422,948 A | 12/1983 | Corley et al. |
| 4,467,996 A | 8/1984 | Baugh |
| 4,538,684 A | 9/1985 | Sheffield |
| 4,562,888 A | 1/1986 | Collet |
| 4,603,578 A | 8/1986 | Stoltz |
| 4,696,502 A | 9/1987 | Desai |
| 4,772,391 A | 9/1988 | Baker et al. |
| 4,834,184 A | 5/1989 | Streich et al. |
| 4,869,321 A | 9/1989 | Hamilton |
| 4,898,245 A | 2/1990 | Braddick |
| 4,953,617 A | 9/1990 | Ross et al. |
| 4,980,061 A | 12/1990 | Tadros et al. |
| 5,012,863 A | 5/1991 | Springer |
| 5,117,909 A | 6/1992 | Wilton et al. |
| 5,129,956 A | 7/1992 | Christopher et al. |
| 5,176,208 A | 1/1993 | Lalande et al. |
| 5,197,547 A | 3/1993 | Morgan |
| 5,295,541 A | 3/1994 | Ng et al. |
| 5,330,000 A | 7/1994 | Givens et al. |
| 5,358,048 A | 10/1994 | Brooks |
| 5,368,889 A | 11/1994 | Johnson et al. |
| 5,507,346 A | 4/1996 | Gano et al. |
| 5,580,114 A | 12/1996 | Palmer |
| 5,678,635 A | 10/1997 | Dunlap et al. |
| 5,783,079 A | 7/1998 | Kumano et al. |
| 5,833,001 A | 11/1998 | Song et al. |
| 5,842,518 A | 12/1998 | Soybel et al. |
| 5,924,489 A | 7/1999 | Hatcher |
| 5,944,101 A | 8/1999 | Hearn |
| 6,138,764 A | 10/2000 | Scarsdale et al. |
| 6,247,542 B1 | 6/2001 | Kruspe et al. |
| 6,276,452 B1 | 8/2001 | Davis et al. |
| 6,371,204 B1 | 4/2002 | Singh et al. |
| 6,491,108 B1 | 12/2002 | Slup et al. |
| 6,595,289 B2 | 7/2003 | Tumlin et al. |
| 6,688,386 B2 | 2/2004 | Cornelssen |
| 6,768,106 B2 | 7/2004 | Gzara et al. |
| 6,808,023 B2 | 10/2004 | Smith et al. |
| 6,899,178 B2 | 5/2005 | Tubel |
| 6,913,084 B2 | 7/2005 | Boyd |
| 7,049,272 B2 | 5/2006 | Sinclair et al. |
| 7,096,950 B2 | 8/2006 | Howlett et al. |
| 7,117,956 B2 | 10/2006 | Grattan et al. |
| 7,188,674 B2 | 3/2007 | McGavern, III et al. |
| 7,188,675 B2 | 3/2007 | Reynolds |
| 7,231,975 B2 | 6/2007 | Lavaure et al. |
| 7,249,633 B2 | 7/2007 | Ravensbergen et al. |
| 7,284,611 B2 | 10/2007 | Reddy et al. |
| 7,398,832 B2 | 7/2008 | Brisco |
| 7,405,182 B2 | 7/2008 | Verrett |
| 7,424,909 B2 | 9/2008 | Roberts et al. |
| 7,488,705 B2 | 2/2009 | Reddy et al. |
| 7,497,260 B2 | 3/2009 | Telfer |
| 7,591,305 B2 | 9/2009 | Brookey et al. |
| 7,600,572 B2 | 10/2009 | Slup et al. |
| 7,712,527 B2 | 5/2010 | Roddy |
| 7,762,323 B2 | 7/2010 | Frazier |
| 7,802,621 B2 | 9/2010 | Richards et al. |
| 7,934,552 B2 | 5/2011 | La Rovere |
| 7,965,175 B2 | 6/2011 | Yamano |
| 8,002,049 B2 | 8/2011 | Keese et al. |
| 8,069,916 B2 | 12/2011 | Giroux et al. |
| 8,376,051 B2 | 2/2013 | McGrath et al. |
| 8,453,724 B2 | 6/2013 | Zhou |
| 8,496,055 B2 | 7/2013 | Mootoo et al. |
| 8,579,024 B2 | 11/2013 | Mailand et al. |
| 8,726,983 B2 | 5/2014 | Khan |
| 8,770,276 B1 | 7/2014 | Nish et al. |
| 8,899,338 B2 | 12/2014 | Elsayed et al. |
| 9,109,433 B2 | 8/2015 | DiFoggio et al. |
| 9,133,671 B2 | 9/2015 | Kellner |
| 9,212,532 B2 | 12/2015 | Leuchtenberg et al. |
| 9,234,394 B2 | 1/2016 | Wheater et al. |
| 9,359,861 B2 | 6/2016 | Burgos |
| 9,410,066 B2 | 8/2016 | Ghassemzadeh |
| 9,416,617 B2 | 8/2016 | Wiese et al. |
| 9,551,200 B2 | 1/2017 | Read et al. |
| 9,574,417 B2 | 2/2017 | Laird et al. |
| 9,657,213 B2 | 5/2017 | Murphy et al. |
| 9,976,407 B2 | 5/2018 | Ash et al. |
| 10,087,752 B2 | 10/2018 | Bedouet |
| 10,280,706 B1 | 5/2019 | Sharp, III |
| 10,301,898 B2 | 5/2019 | Orban |
| 2002/0053428 A1 | 5/2002 | Maples |
| 2003/0047312 A1 | 3/2003 | Bell |
| 2003/0132224 A1 | 7/2003 | Spencer |
| 2005/0167097 A1 | 8/2005 | Sommers et al. |
| 2007/0137528 A1 | 6/2007 | Roy-Ddelage et al. |
| 2007/0181304 A1 | 8/2007 | Rankin et al. |
| 2008/0236841 A1 | 10/2008 | Howlett et al. |
| 2008/0251253 A1 | 10/2008 | Lumbye |
| 2009/0194290 A1 | 8/2009 | Parks et al. |
| 2009/0250220 A1 | 10/2009 | Stamoulis |
| 2010/0270018 A1 | 10/2010 | Howlett |
| 2011/0036570 A1 | 2/2011 | La Rovere et al. |
| 2011/0056681 A1 | 3/2011 | Khan |
| 2011/0067869 A1 | 3/2011 | Bour et al. |
| 2011/0168411 A1 | 7/2011 | Braddick |
| 2011/0259609 A1 | 10/2011 | Hessels et al. |
| 2011/0278021 A1 | 11/2011 | Travis et al. |
| 2012/0012335 A1 | 1/2012 | White et al. |
| 2012/0118571 A1 | 5/2012 | Zhou |
| 2012/0170406 A1 | 7/2012 | DiFoggio et al. |
| 2013/0240207 A1 | 9/2013 | Frazier |
| 2013/0296199 A1 | 11/2013 | Ghassemzadeh |
| 2015/0042004 A1* | 2/2015 | Sumi ............... B01D 67/0016 264/48 |
| 2015/0060364 A1 | 3/2015 | McCutcheon et al. |
| 2015/0265974 A1* | 9/2015 | Kurashina ............ B01D 69/087 264/13 |
| 2016/0237810 A1 | 8/2016 | Beaman et al. |

(56) References Cited

U.S. PATENT DOCUMENTS

| | | |
|---|---|---|
| 2016/0281458 A1 | 9/2016 | Greenlee |
| 2016/0305215 A1 | 10/2016 | Harris et al. |
| 2016/0370250 A1* | 12/2016 | Hiraoka ............... G01M 3/06 |
| 2017/0044864 A1 | 2/2017 | Sabins et al. |
| 2017/0058628 A1 | 3/2017 | Van Wijk et al. |
| 2017/0067313 A1 | 3/2017 | Connell et al. |
| 2018/0187498 A1 | 7/2018 | Soto et al. |
| 2018/0245427 A1 | 8/2018 | Jimenez et al. |
| 2019/0024473 A1 | 1/2019 | Arefi |
| 2019/0049017 A1 | 2/2019 | Mcadam |
| 2019/0316424 A1 | 10/2019 | Robinchaux et al. |

FOREIGN PATENT DOCUMENTS

| | | |
|---|---|---|
| CA | 2734032 | 6/2016 |
| CN | 100411721 | 8/2008 |
| CN | 101658763 | 8/2011 |
| CN | 106731873 | 5/2017 |
| CN | 110237719 | 9/2019 |
| DE | 756808 | 6/1953 |
| DK | 2236742 | 8/2017 |
| EP | 033076 | 8/1989 |
| EP | 2674210 | 12/2013 |
| EP | 2735856 | 5/2014 |
| GB | 2392183 | 2/2004 |
| GB | 2453279 | 1/2009 |
| GB | 2492663 | 1/2014 |
| JP | 3250644 | 1/2002 |
| JP | 2008161755 A * | 7/2008 |
| WO | WO 1989012728 | 12/1989 |
| WO | WO 2002090711 | 11/2002 |
| WO | WO 2010132807 | 11/2010 |
| WO | WO 2012164023 | 12/2012 |
| WO | WO 2017001260 | 1/2017 |
| WO | WO 2017099671 | 6/2017 |
| WO | WO 2019132877 | 7/2019 |

OTHER PUBLICATIONS

Li Zhen—CN 106731873 A Machine Translation—May 2017 (Year: 2017).*

PCT International Search Report and Written Opinion in International Appln. No. PCT/US2021/017,237, dated May 6, 2021, 14 pages.

Bruton et al., "Whipstock Options for Sidetracking," Oilfield Review, vol. 26, No. 1, Spring 2014, 10 pages.

Chou et al., "Characteristics and potential applications of a novel forward osmosis hollow fiber membrane," Desalination vol. 261, 2010, 8 pages.

Fang et al., "Interfacially polymerized composite nanofiltration hollow fiber membranes for low-pressure water softening", Journal of Membrane Science 430 (2013) 129-139, 11 pages.

Ingole et al., "Synthesis, characterization and surface modification of PES hollow fiber membrane support with polydopamine and thin film composite for energy generation", Chemical Engineering Journal 243 (2014) 137-146, 10 pages.

Khulbe et al., "Thin-film composite and/or thin film nanocomposite hollow fiber membrane for water treatment, pervaporation, and gas/vapor separation," Polymers 10 (2018) 1051, 22 pages.

Lan et al., "A recent progress in thin film composite membrane: A review," Desalination vol. 287, 2012, 11 pages.

Lan et al., "Progress in interfacial polymerization technique on composite membrane preparation," 2011 2nd International Conference on Environmental Engineering and Applications, 5 pages.

Liu et al., "Fabrication of a high-flux thin film composite hollow fiber nanofiltration membrane for wastewater treatment," Journal of Membrane Science 478 (2015) 25-36, 12 pages.

Scribd [online], "Milling Practices and Procedures," retrieved from URL <https://www.scribd.com/document/358420338/Milling-Rev-2-Secured>, 80 pages.

Tam International Inflatable and Swellable Packers, "TAM Scab Liner brochure," Tam International, available on or before Nov. 15, 2016, 4 pages.

Wan et al., "Thin-film composite hollow fiber membrane with inorganic salt additives for high mechanical strength and high power density for pressure-retarded osmosis," Journal of Membrane Science 555 (2018) 388-397, 34 pages.

Wang et al., "Characterization of novel forward osmosis hollow fiber membranes," Journal of Membrane Science vol. 355, 2010, 10 pages.

Yasukawa et al., "Preparation of a forward osmosis membrane using a highly porous polyketone microfiltration membrane as a novel support," Journal of Membrane Science 487 (2015) 51-59, 9 pages.

Zhou et al., "Interfacial polymerization on PES hollow fiber membranes using mixed diamines for nanofiltration removal of salts containing oxyanions and ferric ions," Desalination 394 (2016) 176-184, 9 pages.

* cited by examiner

THIN FILM COMPOSITE HOLLOW FIBER MEMBRANES FABRICATION SYSTEMS

TECHNICAL FIELD

This document relates to methods and apparatuses for the fabrication of thin film composite hollow fiber membranes.

BACKGROUND

Thin film composite membranes are semipermeable membranes. These membranes can be used in purification and separation processes such as water purification, including nanofiltration and reverse osmosis. These membranes can also be used in gas separations, for example, helium extraction and hydrogen recovery from natural gas processing. Thin film composite membranes can be planar or hollow fiber structures that separate two environments or phases.

SUMMARY

This disclosure describes thin film composite hollow fiber membrane fabrication systems.

The following units of measure have been mentioned in this disclosure:

| Unit of Measure | Full form |
| --- | --- |
| mm | millimeter |
| um | micrometer |
| nm | nanometer |
| cm$^2$ | square centimeter |
| psi | pounds per square inch |
| °C. | degrees Celsius |
| wt % | percent by weight |
| wt/vol % | percent weight by volume |

In some implementations, an apparatus for fabricating thin film composite hollow fiber membranes includes a housing, an inlet formed on a first surface of the housing, and an outlet formed on a second surface of the housing opposite the first surface. The housing defines a first hollow passage between the inlet and the outlet. The first hollow passage is configured to allow a hollow fiber to pass through the housing. The apparatus includes a vacuum port formed on a third surface of the housing. The housing defines a second hollow passage between the first hollow passage and the vacuum port. The vacuum port is configured to draw gas from the inlet and the outlet, and through the first hollow passage and the second hollow passage.

This aspect, taken alone or combinable with any other aspect, can include the following features. The third surface is substantially perpendicular to the first surface or the second surface.

This aspect, taken alone or combinable with any other aspect, can include the following features. The second hollow passage is substantially perpendicular to the first hollow passage.

This aspect, taken alone or combinable with any other aspect, can include the following features. The housing includes a first plate and a second plate configured to be joined together to form the housing.

This aspect, taken alone or combinable with any other aspect, can include the following features. The first plate defines at least a portion of the first hollow passage and the second plate defines a remainder of the first hollow passage.

This aspect, taken alone or combinable with any other aspect, can include the following features. The second plate defines the second hollow passage.

This aspect, taken alone or combinable with any other aspect, can include the following features. The first plate and the second plate are separably coupled by a coupling mechanism.

This aspect, taken alone or combinable with any other aspect, can include the following features. The coupling mechanism includes a hinge or a magnet or a hinge and a magnet.

This aspect, taken alone or combinable with any other aspect, can include the following features. The first plate has a substantially rectangular cross-section and the second plate has a substantially T-shaped cross-section.

In some implementations, a system for fabricating thin film composite hollow fiber membranes includes an apparatus including a housing, an inlet formed on a first surface of the housing, and an outlet formed on a second surface of the housing opposite the first surface. The housing defines a first hollow passage between the inlet and the outlet, and the first hollow passage is configured to allow a hollow fiber to pass through the housing. The apparatus includes a vacuum port formed on a third surface of the housing. The housing defines a second hollow passage between the first hollow passage and the vacuum port, and the vacuum port is configured to draw gas from the inlet and the outlet and through the first hollow passage and the second hollow passage. A vacuum source can be coupled to the vacuum port, and the vacuum source can be configured to apply vacuum to the vacuum port to draw the gas from the inlet and the outlet and through the first hollow passage and the second hollow passage.

This aspect, taken alone or combinable with any other aspect, can include the following features. The housing includes a first plate and a second plate configured to be joined together to form the housing.

This aspect, taken alone or combinable with any other aspect, can include the following features. The first plate defines at least a portion of the first hollow passage and the second plate defines a remainder of the first hollow passage.

This aspect, taken alone or combinable with any other aspect, can include the following features. The second plate defines the second hollow passage.

This aspect, taken alone or combinable with any other aspect, can include the following features. The first plate and the second plate are separably coupled by a coupling mechanism.

This aspect, taken alone or combinable with any other aspect, can include the following features. The coupling mechanism includes a hinge or a magnet or a hinge and a magnet.

In some implementations, a method of fabricating thin film composite hollow fiber membranes includes passing a hollow fiber through a first hollow passage defined by a housing between an inlet formed on a first surface of the housing and an outlet formed on a second surface of the housing opposite the first surface, wherein the hollow fiber is immersed in a first solution prior to passing the hollow fiber through the first hollow passage. The method includes, while passing the hollow fiber through the first hollow passage, drawing, by vacuum, a gas through the first hollow passage and over the hollow fiber through a second hollow passage defined by the housing. The second hollow passage terminates in a vacuum port formed on a third surface of the housing. Drawing the gas over the hollow fiber removes at least a portion of the first solution from an outer surface of the hollow fiber.

This aspect, taken alone or combinable with any other aspect, can include the following features. After passing the hollow fiber through the outlet, the hollow fiber is immersed in a second solution. The first solution and the second solution are immiscible, wherein contact between the first solution and the second solution causes a polymerization reaction at an interface of the first solution and the second solution.

This aspect, taken alone or combinable with any other aspect, can include the following features. Immersing the hollow fiber in a first solution can include immersing the hollow fiber in an aqueous solution. The aqueous solution includes monomeric arylene polyamine.

This aspect, taken alone or combinable with any other aspect, can include the following features. Immersing the hollow fiber in a second solution can include immersing the hollow fiber in a solution that includes a monomeric acyl halide.

This aspect, taken alone or combinable with any other aspect, can include the following features. Drawing, by vacuum, the gas through the first hollow passage and over the hollow fiber through the second hollow passage can include drawing the gas through the inlet and the outlet towards the vacuum port.

In some implementations, an apparatus for fabricating thin film composite hollow fiber membranes can include a housing, an inlet formed on a first surface of the housing, and an outlet formed on a second surface of the housing opposite the first surface. The housing defines a first hollow passage between the inlet and the outlet, and the first hollow passage is configured to allow a hollow fiber to pass through the housing in a direction from the inlet to the outlet. The apparatus includes a compressed gas port formed on the housing. The housing defines a second hollow passage between the first hollow passage and the compressed gas port. The compressed gas port is configured to flow compressed gas through the second hollow passage toward the first hollow passage, toward the inlet.

This aspect, taken alone or combinable with any other aspect, can include the following features. The compressed gas port is formed on the second surface adjacent the outlet.

This aspect, taken alone or combinable with any other aspect, can include the following features. The apparatus can include a second compressed gas port formed on the housing. The housing defines a third hollow passage between the first hollow passage and the second compressed gas port. The second compressed gas port is configured to flow compressed gas through the third hollow passage and into the first hollow passage towards the inlet.

This aspect, taken alone or combinable with any other aspect, can include the following features. The second hollow passage and the third hollow passage share a common outlet to the first hollow passage.

This aspect, taken alone or combinable with any other aspect, can include the following features. The common outlet is positioned substantially at a mid-point of the first hollow passage.

This aspect, taken alone or combinable with any other aspect, can include the following features. The housing includes a first plate and a second plate configured to be joined together to form the housing.

This aspect, taken alone or combinable with any other aspect, can include the following features. The first plate defines at least a portion of the first hollow passage and the second plate defines a remainder of the first hollow passage.

This aspect, taken alone or combinable with any other aspect, can include the following features. The second plate defines the second hollow passage.

This aspect, taken alone or combinable with any other aspect, can include the following features. The first plate and the second plate are separably coupled by a coupling mechanism.

This aspect, taken alone or combinable with any other aspect, can include the following features. The coupling mechanism includes a hinge or a magnet or a hinge and a magnet.

This aspect, taken alone or combinable with any other aspect, can include the following features. The first plate has a substantially rectangular cross-section and the second plate has a substantially T-shaped cross-section.

In some implementations, a system for fabricating thin film composite hollow fiber membranes includes an apparatus. The apparatus includes a housing, an inlet formed on a first surface of the housing, and an outlet formed on a second surface of the housing opposite the first surface. The housing defines a first hollow passage between the inlet and the outlet. The first hollow passage is configured to allow a hollow fiber to pass through the housing in a direction from the inlet to the outlet. The apparatus includes a compressed gas port formed on the housing. The housing defines a second hollow passage between the first hollow passage and the compressed gas port. The compressed gas port is configured to flow compressed gas through the second hollow passage toward the first hollow passage, toward the inlet. The system includes a compressed gas source coupled to the compressed gas port. The compressed gas source is configured to flow compressed gas to the compressed gas port and through the second hollow passage and the first hollow passage toward the inlet.

This aspect, taken alone or combinable with any other aspect, can include the following features. The compressed gas port is formed on the second surface adjacent the outlet.

This aspect, taken alone or combinable with any other aspect, can include the following features. The system includes a second compressed gas port formed on the housing. The housing defines a third hollow passage between the first hollow passage and the second compressed gas port. The second compressed gas port is configured to flow compressed gas through the third hollow passage into the first hollow passage in towards the inlet. The compressed gas source is coupled to the second compressed gas port to flow compressed gas to the second compressed gas port and through the third hollow passage and the first hollow passage toward the inlet.

This aspect, taken alone or combinable with any other aspect, can include the following features. The second hollow passage and the third hollow passage share a common outlet to the first hollow passage.

This aspect, taken alone or combinable with any other aspect, can include the following features. The common outlet is positioned substantially at a mid-point of the first hollow passage.

This aspect, taken alone or combinable with any other aspect, can include the following features. The housing includes a first plate and a second plate configured to be joined together to form the housing.

In some implementations, a method of fabricating thin film composite hollow fiber membranes includes passing a hollow fiber through a first hollow passage defined by a housing between an inlet formed on a first surface of the housing and an outlet formed on a second surface of the housing opposite the first surface. The hollow fiber is immersed in a first solution prior to passing the hollow fiber through the first hollow passage from the inlet toward the outlet. A compressed gas source flows compressed gas through a second hollow passage defined by the housing and through the first hollow passage while the hollow fiber passes through the first hollow passage. The second hollow passage originates at a compressed gas port formed on the housing. The compressed gas flows toward the inlet in a direction at least partially opposite a direction in which the hollow fiber is passed. Flowing the compressed gas over the hollow fiber removes at least a portion of the first solution from an outer surface of the hollow fiber.

This aspect, taken alone or combinable with any other aspect, can include the following features. After passing the hollow fiber through the outlet, the hollow fiber is immersed in a second solution. The first solution and the second solution are immiscible, and contact between the first solution and the second solution causes a polymerization reaction at an interface of the first solution and the second solution.

This aspect, taken alone or combinable with any other aspect, can include the following features. The first solution includes an aqueous solution. The aqueous solution includes a monomeric arylene polyamine, and the second solution includes a monomeric acyl halide.

In some implementations, an apparatus for fabricating thin film composite hollow fiber membranes includes a first tubular member fluidly coupled to a compressed gas inlet port, and a second tubular member positioned coaxially within the first tubular member. The second tubular member includes a circumferential wall having a plurality of apertures. The second tubular member is configured to receive a hollow fiber through a hollow portion of the second tubular member. The first tubular member is configured to flow compressed gas received through the compressed gas inlet port into the hollow portion through the plurality of apertures.

This aspect, taken alone or combinable with any other aspect, can include the following features. Each aperture is a through-hole formed in the circumferential wall of the second tubular member. Each aperture has an axis, and an angle between the axis of each aperture and the axis of the second tubular member is configured to flow the compressed gas over the hollow fiber in a direction at least partially opposite to a direction in which the hollow fiber is passed through the hollow portion of the second tubular member.

This aspect, taken alone or combinable with any other aspect, can include the following features. The angle is greater than zero degrees and less than ninety degrees.

This aspect, taken alone or combinable with any other aspect, can include the following features. The angle is substantially 45 degrees.

This aspect, taken alone or combinable with any other aspect, can include the following features. The angles of the apertures are equal to each other.

This aspect, taken alone or combinable with any other aspect, can include the following features. The angles of the apertures are different from each other.

This aspect, taken alone or combinable with any other aspect, can include the following features. The second tubular member is positioned coaxially within the first tubular member. The second tubular member defines an annular region between an inner surface of the first tubular member and an outer surface of the circumferential wall of the second tubular member. The annular region is sealed to force the compressed gas into the hollow portion of the second tubular member through the plurality of apertures.

This aspect, taken alone or combinable with any other aspect, can include the following features. The compressed gas inlet port is formed on a circumferential surface of the first tubular member at substantially a midway location between ends of the first tubular member.

This aspect, taken alone or combinable with any other aspect, can include the following features. The apparatus includes a third tubular member attached to the first tubular member. A first end of the third tubular member is fluidly coupled to a circumferential surface of the first tubular member. The compressed gas inlet port is formed on a second end of the third tubular member.

This aspect, taken alone or combinable with any other aspect, can include the following features. The first tubular member and the third tubular member are substantially perpendicular to each other.

This aspect, taken alone or combinable with any other aspect, can include the following features. The third tubular member is attached to the first tubular member at a location substantially midway between ends of the first tubular member.

In some implementations, a system for fabricating thin film composite hollow fiber membranes includes an apparatus. The apparatus includes a first tubular member fluidly coupled to a compressed gas inlet port, and a second tubular member positioned coaxially within the first tubular member. The second tubular member includes a circumferential wall having a plurality of apertures. The second tubular member is configured to receive a hollow fiber through a hollow portion of the second tubular member. The first tubular member is configured to flow compressed gas received through the compressed gas inlet port into the hollow portion through the plurality of apertures. The system includes a compressed gas source coupled to the compressed gas port. The compressed gas source is configured to flow compressed gas to the compressed gas port and through the plurality of apertures into the hollow portion of the second tubular member towards the inlet.

This aspect, taken alone or combinable with any other aspect, can include the following features. Each aperture is a through-hole formed in the circumferential wall. Each aperture has an axis, and the angle between the axis of each aperture and the axis of the second tubular member is configured to flow the compressed gas over the hollow fiber in a direction at least partially opposite to a direction in which the hollow fiber is passed through the hollow portion of the second tubular member.

This aspect, taken alone or combinable with any other aspect, can include the following features. The angle is greater than zero degrees and less than ninety degrees.

This aspect, taken alone or combinable with any other aspect, can include the following features. The angle is substantially 45 degrees.

This aspect, taken alone or combinable with any other aspect, can include the following features. The angles of the apertures are equal to each other.

This aspect, taken alone or combinable with any other aspect, can include the following features. The angles of the apertures are different from each other.

This aspect, taken alone or combinable with any other aspect, can include the following features. The second tubular member is positioned coaxially within the first tubular member. The second tubular member defines an annular region between an inner surface of the first tubular member and an outer surface of the circumferential wall of the second tubular member. The annular region is sealed to force the compressed gas into the hollow portion of the second tubular member through the plurality of apertures.

In some implementations, a method of fabricating thin film composite hollow fiber membranes includes coaxially positioning a first tubular member around a second tubular member to define an annular region between the first tubular member and the second tubular member. The method includes passing a hollow fiber through a hollow portion of the second tubular member from a first end of the second tubular member toward a second end of the second tubular member. The hollow fiber is immersed in a first solution prior to passing the hollow fiber through the first tubular member. Compressed gas is flowed into the annular region and into the hollow portion through a plurality of apertures formed on a circumferential wall of the second tubular member in a direction at least partially opposite the direction in which the hollow fiber is passed through the second tubular member. Flowing the compressed gas over the hollow fiber removes at least a portion of the first solution from an outer surface of the hollow fiber.

This aspect, taken alone or combinable with any other aspect, can include the following features. After passing the hollow fiber through the second tubular member, the hollow fiber is immersed in a second solution. The first solution and the second solution are immiscible and contact between the first solution and the second solution causes a polymerization reaction at an interface of the first solution and the second solution.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
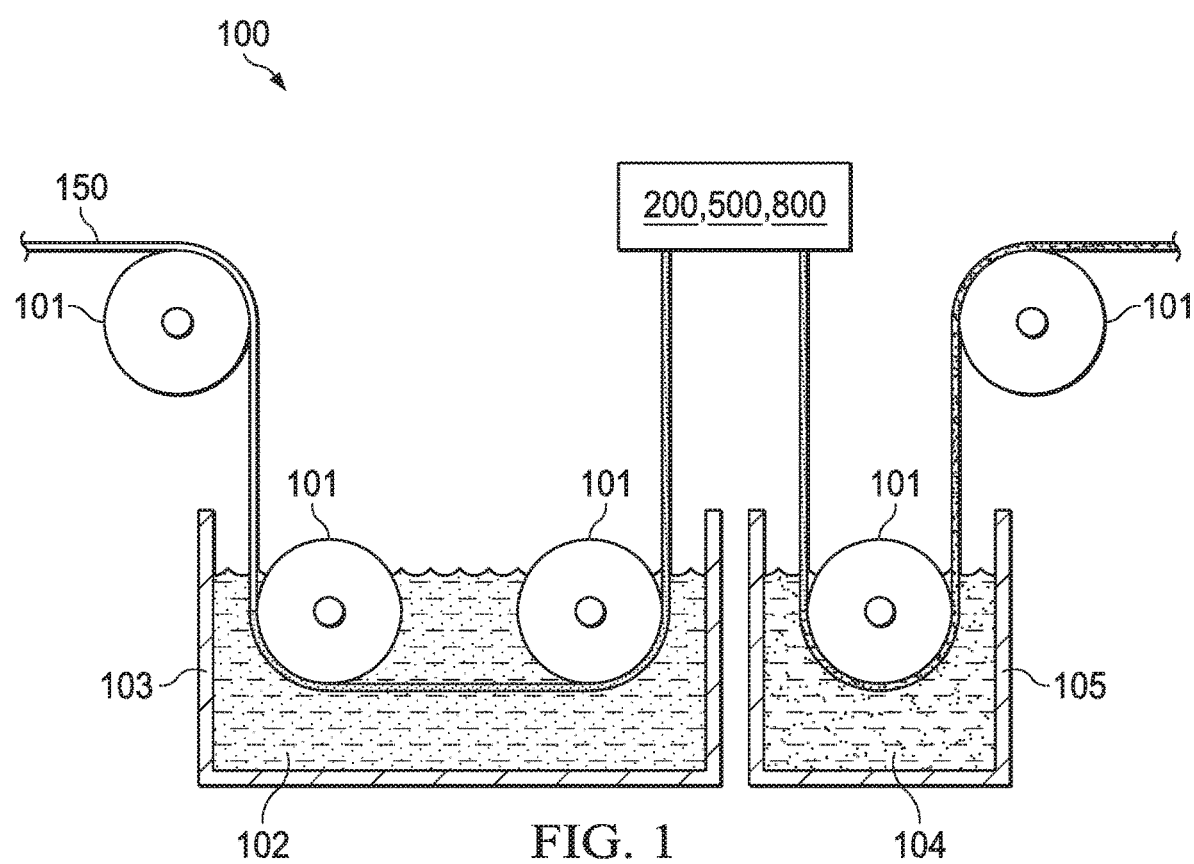
FIG. 1 shows an example of a system configured to produce thin film composite hollow fiber membranes.

Interfacial polymerization can include reacting two or more monomers that are dissolved separately in immiscible liquids. A membrane is formed at the interface between these two solutions. For example, a membrane can be formed at the interface between an aqueous solution containing monomeric arylene polyamine and a solution containing monomeric acyl halide. Planar polymeric nanofiltration and reverse osmosis membranes can be produced by immiscible solutions of aqueous 1,3-phenylenediamine (m-PDA) and trimesoyl chloride (TMC) in n-hexane. Upon contact of the two solutions on the outer surface of a planar support structure, m-PDA and TMC polymerize. As the polymerization reaction proceeds, the interfacial film becomes a barrier that slows further reaction. Accordingly, interfacial polymer films are generally ultrathin, for example, less than 500 nm in thickness.

Interfacial polymerization can be used to prepare membranes by introducing a first solution to a support surface and then exposing the support surface to a second solution. The first solution can be applied to the support surface by spraying an aerosol of the first solution on the surface, or contacting the surface in a bath of the first solution. In both of these approaches, excess first solution is removed from the support surface. A single excess drop can create defects in the thin film membrane, which reduces the performance of the membrane. For example, a single excess droplet of the first solution can cause the formation of free bodies on the support surface. These free bodies fall easily from the film after the polymerization reaction, and can cause the membrane performance to drop significantly.

One method of preparing thin films using interfacial polymerization includes the use of rollers and solution baths to form flat sheet membranes. In this method, a flat support sheet travels along a system of rollers. The flat surface is immersed in a first solution, for example, aqueous m-PDA. The flat sheet is then pressed between two rollers, referred to as nip rollers, to remove excess first solution. The support surface is then immersed in a second solution, for example, TMC in n-hexane, to result in the formation of a thin film membrane on the flat surface.

This disclosure describes devices and methods for forming thin film composite hollow fiber membranes as opposed to flat sheet membranes. The system described above to form flat sheet membranes is not suitable for forming thin film composite hollow fiber membranes due to differences in geometry between the two types of membranes. For example, pressing a hollow fiber between nip rollers causes the fiber to collapse, and can induce breakage or damage to the hollow fiber. This disclosure describes methods and apparatuses that flow a gas (for example, compressed gas or ambient air) past a surface of a hollow fiber that has been immersed in a first solution prior to immersion in a second solution. In some implementations, the gas is flowed past the surface under positive pressure, while, in other implementations, the gas is flowed under negative pressure, for example, vacuum. Flow parameters of the gas are selected to remove the excess first solution. Using the apparatuses described in this disclosure can remove excess first solution, allow for the use of a roller system (described below with reference to FIG. 1), and allow for the continuous movement of the hollow fibers along rollers and through the two solution reservoirs.

Reference will now be made in detail to certain embodiments of the disclosed subject matter, examples of which are illustrated in part in the accompanying drawings. While the disclosed subject matter will be described in conjunction with the enumerated claims, it will be understood that the example subject matter is not intended to limit the claims to the disclosed subject matter. Provided in this disclosure, in part, are methods and apparatuses for producing thin film composite hollow fiber membranes.

FIG. 1 shows an example of a system configured to produce thin film composite hollow fiber membranes using an apparatus. A system 100 can include a hollow fiber 150 that can travel between or over a series of rollers 101. The hollow fiber 150 can be a semi-permeable hollow fiber. The rollers 101 are positioned to immerse the hollow fiber 150 in a first solution 102. The first solution 102 can be held in a first reservoir 103. The hollow fiber then passes through one or more apparatuses 200, 500, or 800. The hollow fiber can then be immersed in a second solution 104. The second solution 104 can be held in a second reservoir 104. As described in detail with reference to the figures that follow, each of the apparatuses 200, 500 or 800 can remove excess first solution from a surface of the hollow fiber 150 after the hollow fiber 150 has been immersed in the first solution 102 and before the hollow fiber 150 is immersed in the second solution 104.

Figure 2A:
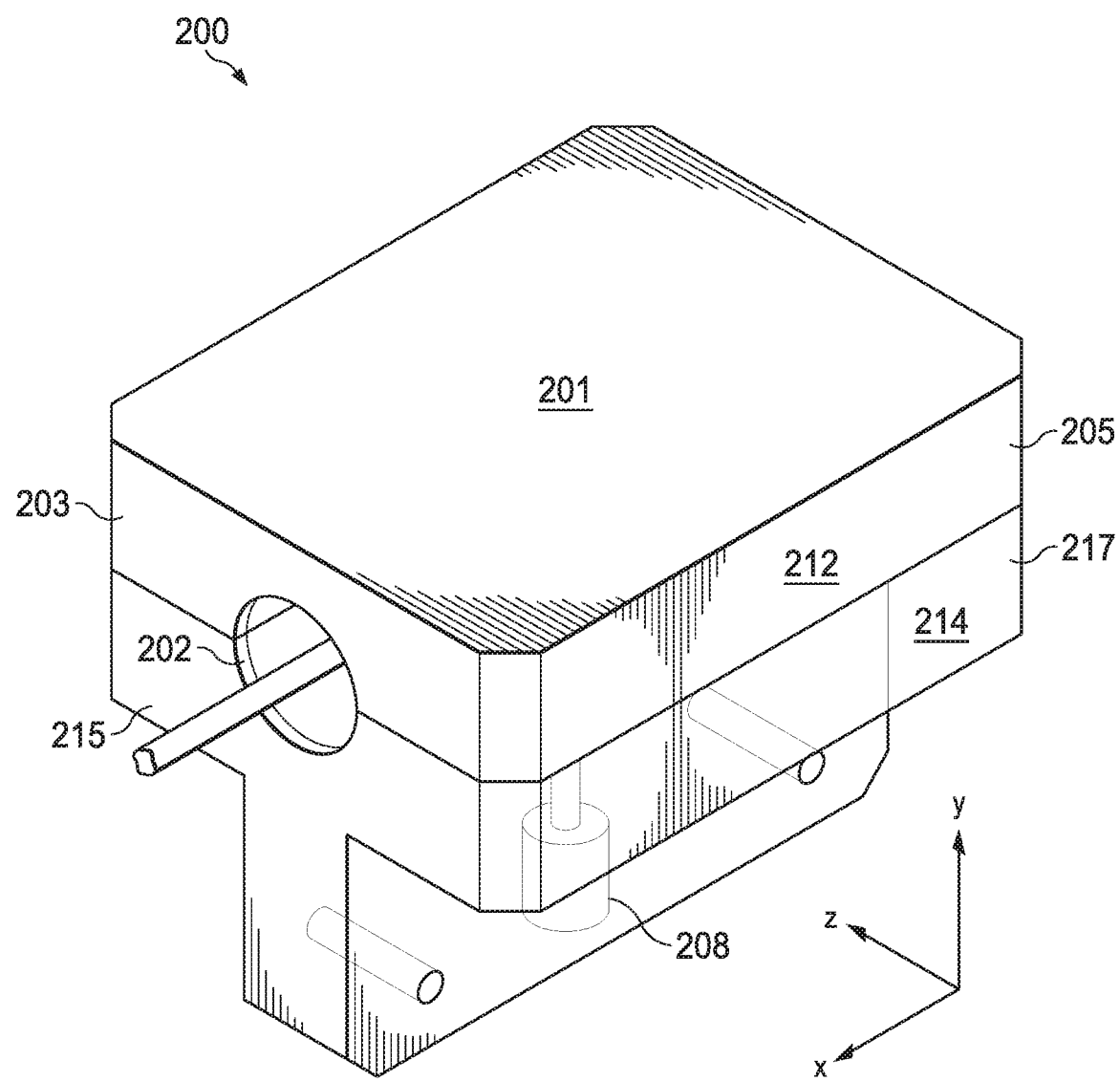
FIG. 2A shows an example of a first implementation of an apparatus.

FIG. 2A shows an example of a perspective view of a first implementation of an apparatus 200. The apparatus 200 can include a housing 201. The housing can comprise metal or plastic, for example, polytetrafluoroethylene, polyethylene, polypropylene, or acrylic. A hollow fiber that has been immersed in the first solution (for example, the first solution 102 of FIG. 1) is passed through the apparatus 200 from an inlet to an outlet via a hollow passage within the apparatus 200. As the hollow fiber passes through the apparatus 200, a gas is flowed past a surface of the hollow fiber through the hollow passage formed. The flowing gas removes excess first solution from the surface of the hollow fiber. Removal of the excess first solution improves the quality of the membrane that results from interfacial polymerization. For example, excess first solution on the hollow fiber causes defects in the membrane, accordingly, removing the excess first solution improves the quality and subsequent performance of the membrane.

Figure 2B:
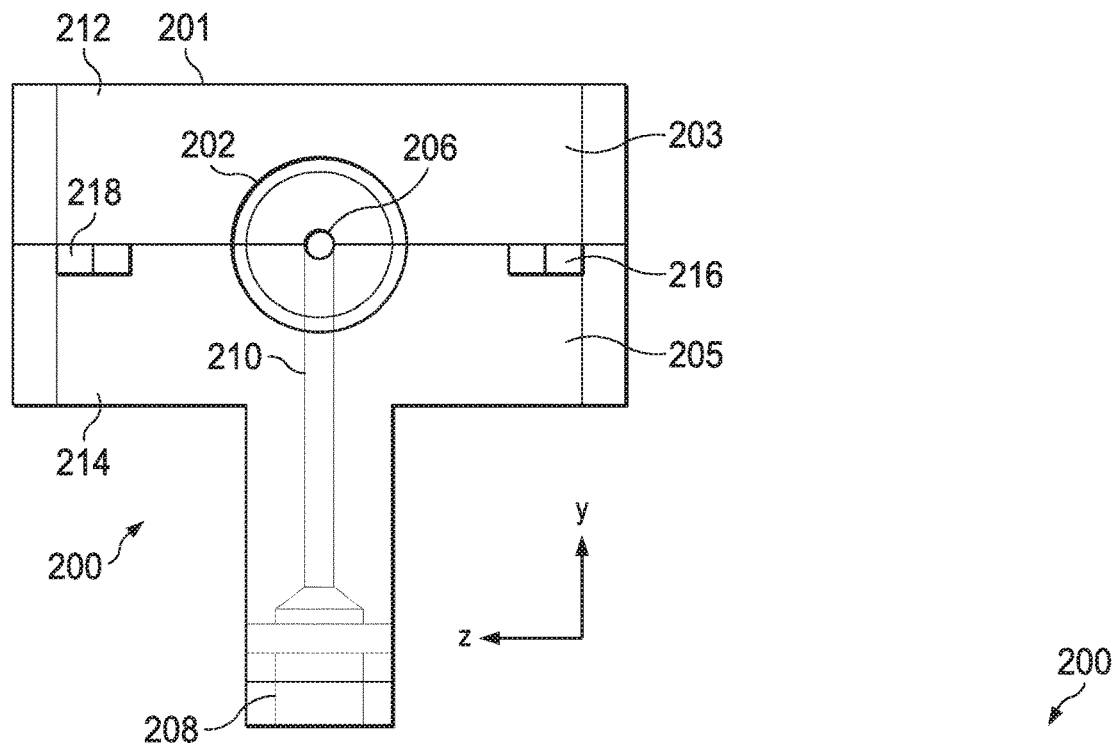
FIG. 2B shows an example of a front view of a first implementation of an apparatus.
Figure 2C:
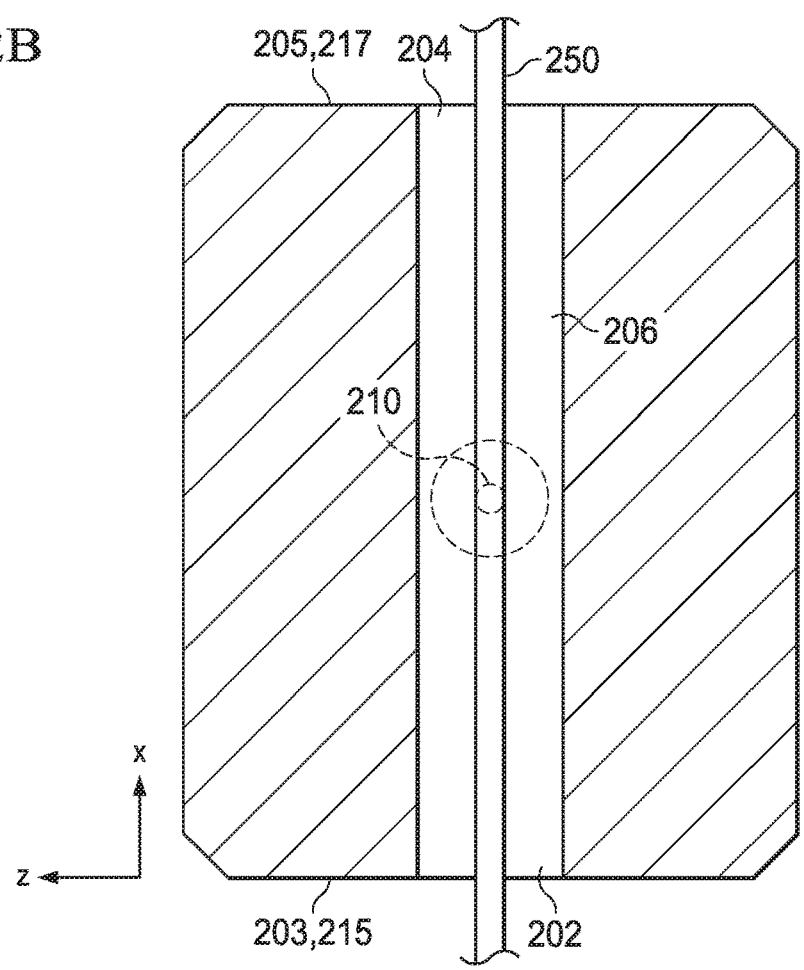
FIG. 2C shows an example of a cross-sectional top view of a first implementation of an apparatus.
Figure 2D:
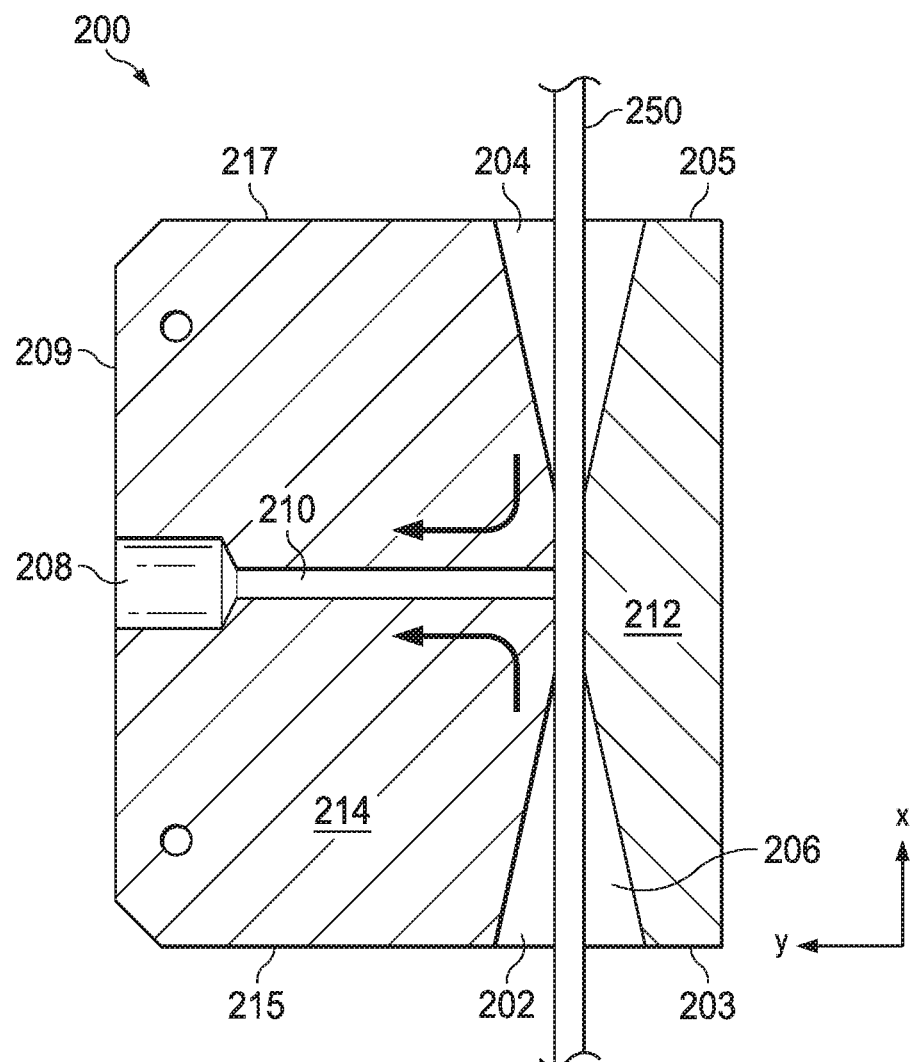
FIG. 2D shows an example of a cross-sectional side view of a first implementation of an apparatus.

In some implementations, the housing includes two plates, a first plate 212 and a second plate 214. The housing 201 is formed by positioning and aligning the top and bottom plates. The first plate 212 can be a top plate and the second plate 214 can be a bottom plate. In some implementations, the first plate 212 can be the bottom plate and the second plate 214 can be the top plate. The first plate 212 can have a first surface 203 and a second surface 205, where the second surface 205 is opposite and parallel to the first surface 203 (FIG. 2A, 2D). The second plate 214 can have a first surface 215 and a second surface 217, where the second surface 217 is opposite and parallel to the first surface 205 (FIG. 2A, 2D). In some implementations, the first plate 212 and the second plate 214 are separably coupled by a coupling mechanism. This reversible coupling can be beneficial for making adjustments to the hollow fiber or for threading the hollow fiber through the apparatus initially. The coupling mechanism can include a hinge 216, a magnet 218, multiple magnets 218, or a combination of two or all of them (FIG. 2B). Any coupling mechanism that allows the first and second plate to be reversibly opened and closed can be suitable, for example, a hinge and a clasp.

The first surface 203 of the first plate 212 can define at least a portion of the inlet 202, and the first surface 215 of the second plate 212 can define a remainder of the inlet 202. The second surface 205 of the first plate 212 can define at least a portion of the outlet 204, and the second surface 217 of the second plate 214 can define a remainder of the outlet 204 (FIG. 2D). A first hollow passage 206 connects the inlet and the outlet (FIGS. 2C, 2D). The first plate 212 can define a first portion of the first hollow passage 206 and the second plate 214 can define a second portion of the first hollow passage 206. Accordingly, in some implementations the first hollow passage 206 is formed when the first and second plates are joined together (FIG. 2D).

The second plate can include a third surface 209 perpendicular to the first and second surfaces of the first and second plates (FIG. 2D). The third surface can include a vacuum port 208. The vacuum port 208 is configured to be connected to a vacuum source. A second hollow passage 210 connects the vacuum port to the first hollow passage 206 (FIGS. 2B, 2C, 2D). The second hollow passage 210 is configured for the movement of air or gas through the second hollow passage. The hollow fiber 250 does not pass through the second hollow passage 210.

FIG. 2B shows an example of a front view of the apparatus 200 with plates 212 and 214. The first plate 212 can have a substantially rectangular cross-section. The substantially rectangular cross-section allows the hollow fiber to pass through the apparatus 200. The second plate 214 can have a substantially T-shaped cross-section. The substantially T-shaped cross-section allows the vacuum port 208 to be placed at an optimal distance and an angle relative to the first hollow passage 206. This allows for the vacuum port and vacuum source to remove excess first solution from the hollow fiber without damaging the hollow fiber. As shown in FIG. 2B, the first plate 212 can define at least a portion of the inlet 202, and the second plate 214 can define a remainder of the inlet 202. The inlet 202, outlet 204, and first hollow passage 206 can be sufficiently large to allow a hollow fiber to pass through the apparatus 200 without coming into contact with the sides of the first hollow passage 206. The inlet, outlet, and first hollow passage can have, for example, a diameter of 0.5 to 10 mm. Alternatively, the inlet, outlet, and first hollow passage can have, for example, a diameter of 0.5 to 2.0 mm. Further, the inlet, outlet, and first hollow passage can be configured to accommodate the desired hollow fiber. For example, high pressure applications require thin film composite hollow fiber membranes that are thin enough to withstand operating pressures. A hollow microfiber with a diameter of 80 μm can be used for high-pressure applications such as gas separation, reverse osmosis, or nanofiltration. Alternatively, low pressure applications such as microfiltration or ultrafiltration require thicker thin film composite hollow fiber membranes in order to minimize pressure drop through the bore of the fiber. A hollow fiber with a diameter of 1.5 mm can be used for ultrafiltration or microfiltration. Accordingly, the inlet, outlet, and first hollow passage can be configured to these or other hollow fiber diameters. In some implementations, the diameter of the inlet, outlet, and first hollow passage can be between 150%-200% wider than the diameter of the hollow fiber. The inlet 202, outlet 204, and first hollow passage 206 can have any cross-sectional shape that can accommodate the hollow fiber. For example, the inlet, outlet, and first hollow passage can have a triangular, rectangular, star-shaped or substantially circular passage.

The second plate 214 can include the vacuum port 208, as described previously. The second plate 214 can define a second hollow passage 210 formed between the vacuum port 208 and the first hollow passage 206. The second hollow passage 210 is configured for the movement of air or gas through the second hollow passage. The hollow fiber 250 does not pass through the second hollow passage 210. The second hollow passage fluidly connects the vacuum port 208 and the first hollow passage 206. The second hollow passage can connect to the first hollow passage at a point substantially in the middle of the first hollow passage 206. Accordingly, when a vacuum is applied to the vacuum port 208, gas moves from the inlet 202 or the outlet 202 through the first hollow passage 206 towards the second hollow passage 210, and through the second hollow passage 210 towards the vacuum source. In implementations where the second hollow passage 210 connects to a point substantially in the middle of the first hollow passage 206, the gas moves from both the inlet 202 and the outlet 204 towards the second hollow passage 210. In some implementations, the gas is ambient air. In some implementations, the gas is an inert gas, for example nitrogen. The flow rate of the air or gas towards the second hollow passage 210 can be optimized, for example by optimizing for the diameter of the first hollow passage 206, the length of the first hollow passage 206, or the diameter of the hollow fiber.

FIG. 2C shows an example of a cross-sectional top view of the apparatus 200. As shown in FIG. 2C, the hollow fiber 250 can pass through the apparatus 200 from the inlet 202 to the outlet 204 via the first hollow passage 206. The inlet and the outlet can be formed by the first surface (203/215) and second surfaces (205/217) of the first and second plates. In some implementations, the second hollow passage 210 connects to the first hollow passage 206 at a point that is substantially in the middle of the first hollow passage 206.

FIG. 2D shows an example of a cross-sectional side view of the apparatus 200. The apparatus 200 can include a first plate (212) and a second plate (214) with first surfaces (203/215) and second surfaces (205/217) as described previously. The apparatus 200 can include a vacuum port 208 formed on a third surface 209 of the second plate 214, with the second plate 214 defining a second hollow passage 210 between the first hollow passage 206 and the vacuum port 208. The second hollow passage 210 can connect to the first hollow passage 206 at a point substantially in the middle of the first hollow passage 206. In some implementations, the second hollow passage 210 can connect to the first hollow passage at a point substantially at one end of the first hollow passage 206. In some implementations, the third surface 209 is perpendicular to the first surfaces (203/215) and second surfaces (205/217). In some implementations, the second hollow passage 210 is substantially perpendicular to the first hollow passage 206. In some implementations, the second hollow passage 210 is angled relative to the first hollow passage 206. In some implementations, the angle of the second hollow passage is greater than zero degrees and less than ninety degrees. In some implementations, the angle is substantially 45 degrees. In some implementations, the second plate 214 defines the vacuum port 208 and the second hollow passage 210. The vacuum port 208 can be configured to be connected to a vacuum source to draw gas from the inlet 202 and the outlet 204, through the first hollow passage 206 and the second hollow passage 210 as described previously. The gas can be, for example, ambient air or an inert gas such as nitrogen.

In some implementations, the apparatus 200 could include more than one vacuum port, for example, multiple vacuum ports in the third surface 209, with additional hollow passages that connect the vacuum ports to the first follow passage 206.

In an alternative embodiment, the inlet 202, outlet 204, first hollow passage 206, vacuum port 208, and second hollow passage 210 can be defined by the first plate 212. In another alternative embodiment, the inlet 202, outlet 204, first hollow passage 206, vacuum port 208 and second hollow passage 210 can be defined by the second plate 214. The second hollow passage 210 is configured for the movement of air or gas through the second hollow passage. The hollow fiber 250 does not pass through the second hollow passage 210.

Figure 3:
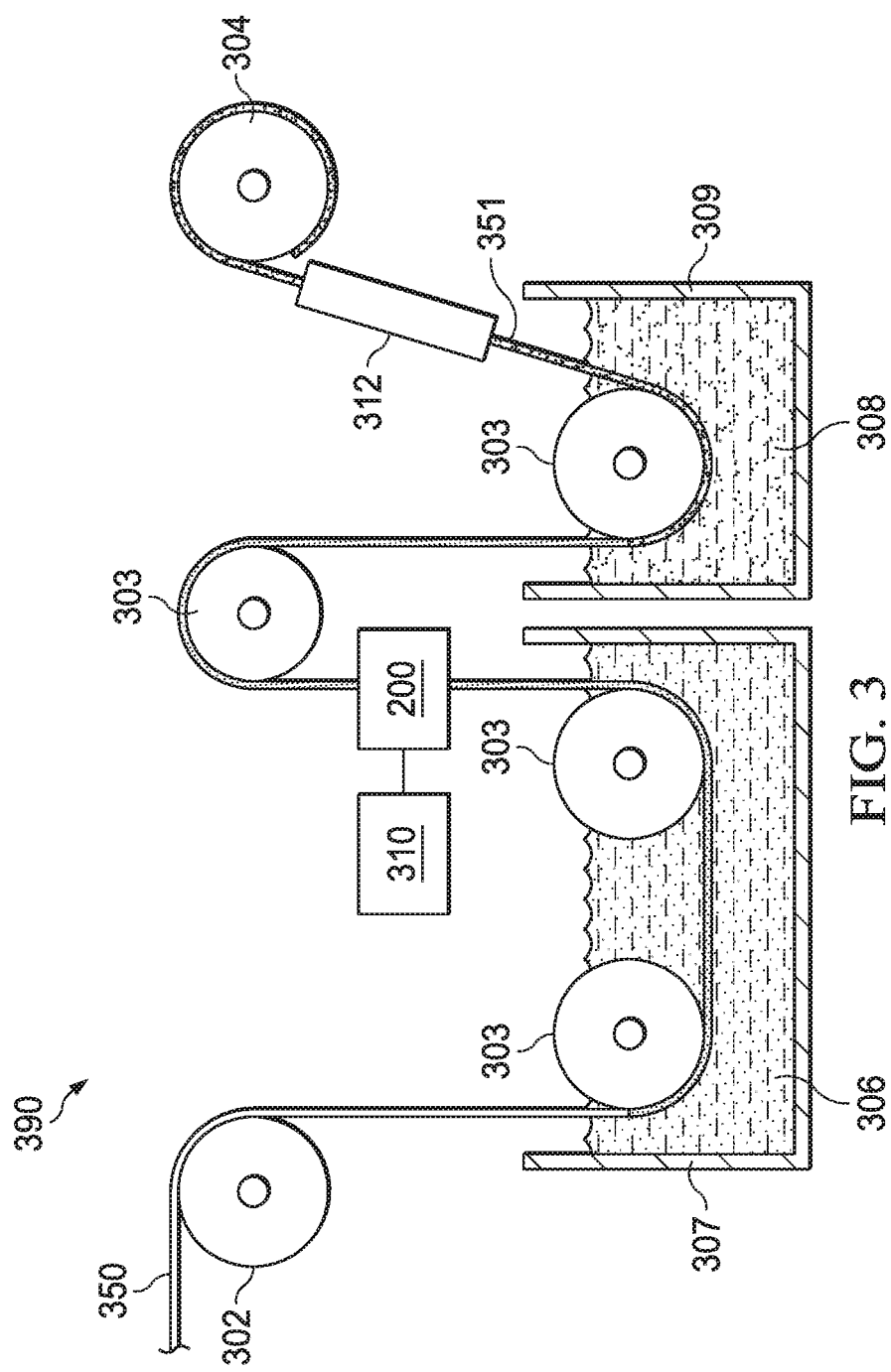
FIG. 3 shows an example of a system configured to produce thin film composite hollow fiber membranes using an apparatus.

FIG. 3 shows an example of a system configured to produce thin film composite hollow fiber membranes using an apparatus. In some implementations, the apparatus 200 can be part of a system 390 for producing a thin film composite on the outer surface of a hollow fiber membrane. The system can include a hollow fiber 350 that is configured to be passed between two bobbins 302 and 304 over a series of rollers 303. The hollow fiber 350 can be a semi-permeable hollow fiber membrane. The hollow fiber can be wound around the first bobbin 302 to create a spool of hollow fiber. The hollow fiber 350 can then unspool from the first bobbin 302 and travel along the series of rollers 303. The rollers are positioned to direct the hollow fiber 350 into a first solution 306, in order to saturate or coat the hollow fiber 350 with the first solution. The first solution 306 can be held in a first reservoir 307. The first solution can be an aqueous solution containing monomeric arylene polyamine, for example, an aqueous solution of 1,3-phenylenediamine. The hollow fiber then passes through the apparatus 200. A vacuum 310 is connected to the apparatus 200 to remove the excess first solution from the hollow fiber 350.

The rollers are positioned to subsequently immerse the hollow fiber 350 in a second solution 308. The second solution can be held in a second reservoir 309. The second solution can be a water immiscible solvent containing monomeric acyl halide, for example, a solution of trimesoyl chloride in n-hexane. After immersing in the second solution, the hollow fiber includes a thin film composite on the outer surface of the membrane, forming a thin film composite hollow fiber membrane 351. The thin film composite hollow fiber membrane 351 then passes through an air drying tower 312. The air drying tower 312 is configured to evaporate unreacted second solution and thermally cure the formed composite membrane. The air drying tower 312 can include a heat gun or a dryer. The heat supplied by the air drying tower 312 can reach temperatures of 150° C. to dry and cure the thin film composite hollow fiber membrane. The thin film composite hollow fiber membrane 351 can then travel to a second bobbin 304 configured to receive the thin film composite hollow fiber membrane 351. The thin film composite hollow fiber membrane 351 can be wound around the second bobbin 304.

The system can include a motor to drive the movement of the hollow fiber, for example, by driving the rotation of the bobbins, the rollers, or a combination of the bobbins and rollers. In some implementations, the second bobbin 304 is connected to a motor and set to a speed that allows for removal of the excess first solution 306 as well as drying of the thin film composite hollow fiber membrane 351. In some implementations, the rotation of the first bobbin 302 is dependently controlled by a tension controller.

Accordingly, the system 390 allows for the formation of a thin film composite hollow fiber membrane along a continuously moving hollow fiber, thus improving efficiency and creating long, continuous membranes. In addition, unlike systems that configure nip-rollers to remove excess first solution, a system that uses the apparatus 200 can be configured to remove excess first solution from a hollow fiber and to produce thin film composite hollow fiber membranes, without pressing or damaging the hollow fiber.

Figure 4:
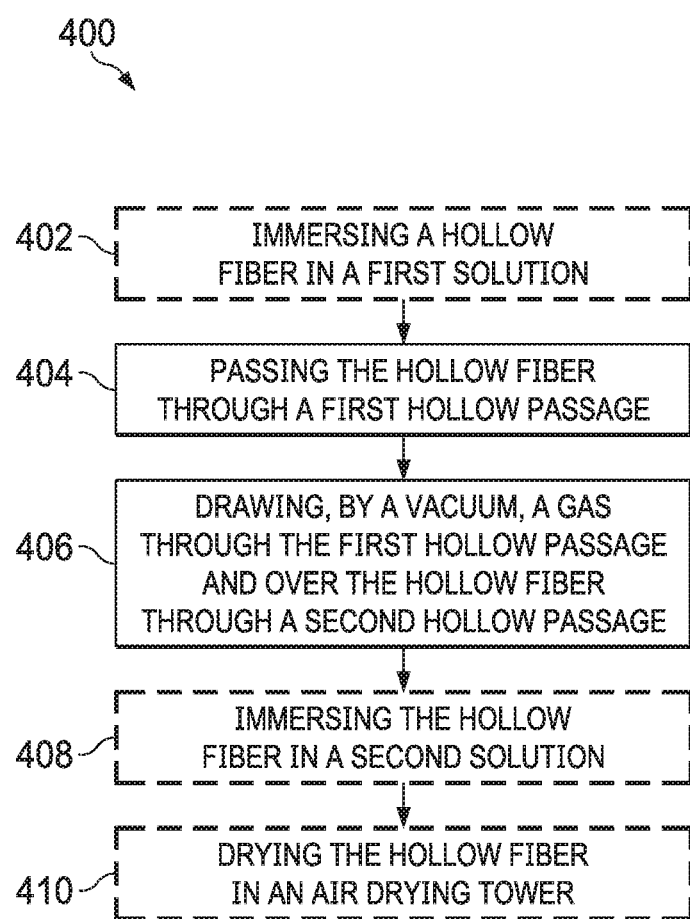
FIG. 4 is a flowchart showing an example method of producing thin film composite hollow fiber membranes.

FIG. 4 is a flowchart showing an example method of producing thin film composite hollow fiber membranes. In some implementations, a method 400 can include passing a hollow fiber through the apparatus 200. In some implementations, at 402 a hollow fiber is immersed in a first solution prior to passing the hollow fiber through the apparatus. The first solution can be an aqueous solution containing monomeric arylene polyamine, for example, an aqueous solution of 1,3-phenylenediamine. Then, at 404, the hollow fiber can be passed through the first hollow passage defined by a housing between an inlet formed on a first surface of the housing and an outlet formed on a second surface of the housing opposite the first surface.

At 406, the vacuum draws gas through the first hollow passage, over the hollow fiber, and through a second hollow passage defined by the housing. Doing so removes at least a portion of the first solution (that is, the excess first solution) from an outer surface of the hollow fiber. A rate at which the gas is drawn by the vacuum is determined by a quantity of the excess first solution on the outer surface of the hollow fiber. In some implementations, the gas is ambient air. In some implementations, the gas is an inert gas, for example, nitrogen.

In some implementations, after passing the hollow fiber through the outlet, the hollow fiber can be immersed in a second solution at 408. The first and second solution can be immiscible, and contact between the first solution on the hollow fiber and the second solution can cause a polymerization reaction at an interface of the first solution and the second solution. In some implementations, the first solution is an aqueous solution containing monomeric arylene polyamine, for example, an aqueous solution of 1,3-phenylenediamine. In some implementations, the second solution is a water immiscible solvent containing monomeric acyl halide, for example, trimesoyl chloride in n-hexane. In some implementations, after immersing the hollow fiber in a second solution, the hollow fiber can be dried in an air-drying tower at 410.

Figure 5A:
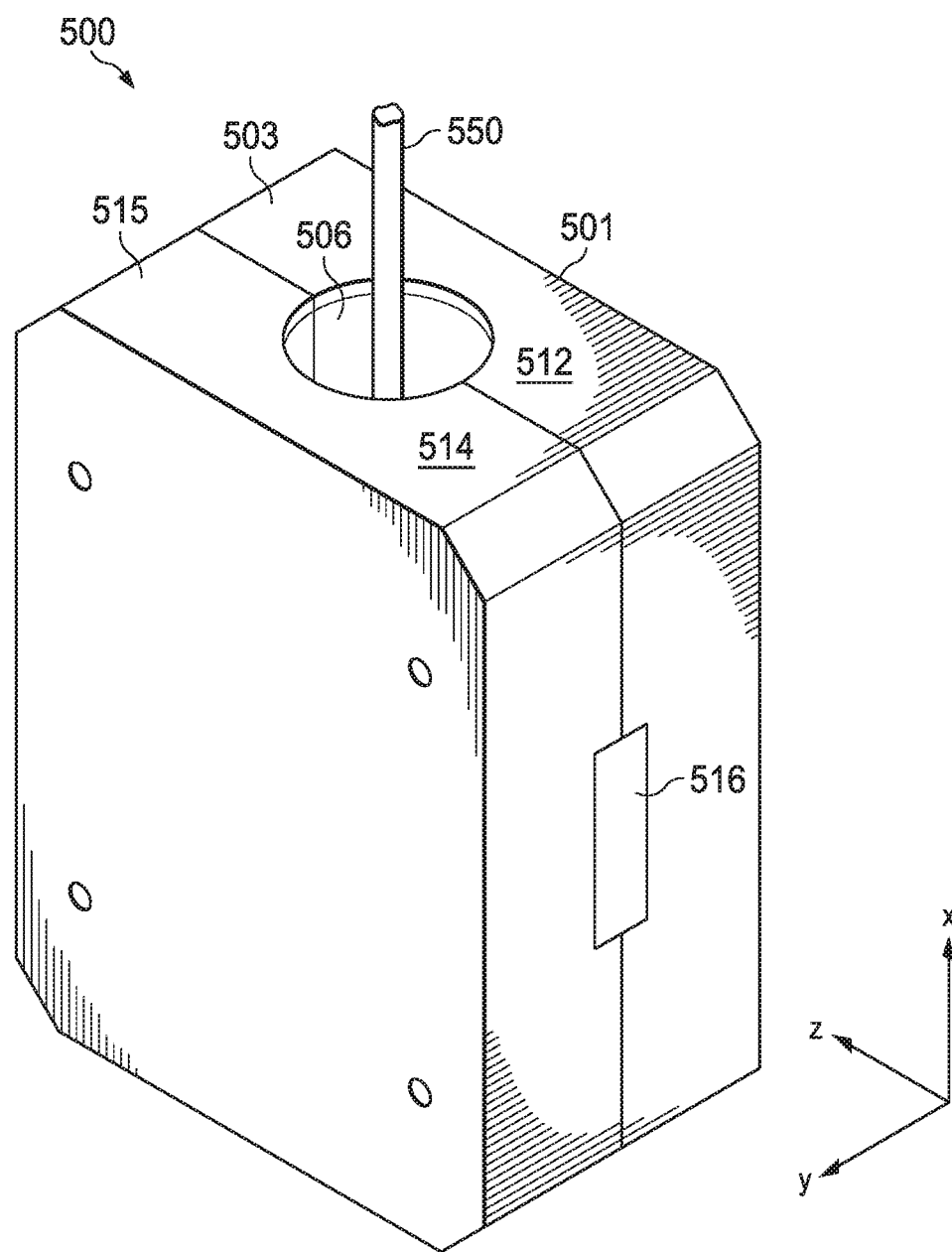
FIG. 5A shows an example of a second implementation of an apparatus.

FIG. 5A shows an example of a perspective view of a second implementation of an apparatus 500. An apparatus 500 can include housing 501. The housing can comprise metal or plastic, for example polytetrafluoroethylene, polyethylene, polypropylene, or acrylic. A hollow fiber that has been immersed in a first solution (for example, the first solution 102 of FIG. 1) is passed through the apparatus 500 from an inlet to an outlet via a hollow passage within the apparatus 500. As the hollow fiber passes through the apparatus 500, a gas is flowed past a surface of the hollow fiber through a hollow passage formed in the apparatus 500. The flowing gas removes at least a portion of the first solution from the surface of the hollow fiber (that is, the excess first solution) from the outer surface of the hollow fiber. Removal of the excess first solution improves the quality of the membrane that results from interfacial polymerization. For example, excess first solution on the hollow fiber causes defects in the membrane. Accordingly, removing the excess first solution improves the quality and subsequent performance of the membrane.

In some implementations, the housing 501 includes two plates, a first plate 512 and a second plate 514. The first plate 512 can be a top plate and the second plate 514 can be a bottom plate. In some implementations, the first plate 512 can be the bottom plate and the second plate 514 can be the top plate. In some implementations, the first plate 512 can be a top plate and the second plate 514 can be a bottom plate. The housing 501 is formed by positioning and aligning the top and bottom plates. In some implementations, the first plate 512 and the second plate 514 are separably coupled by a coupling mechanism. This can be beneficial for making adjustments to the hollow fiber or for threading the hollow fiber through the apparatus initially. The coupling mechanism can include a hinge 516, a magnet 518, multiple magnets 518, or a combination of two or all of them (FIGS. 5A, 5C). Any coupling mechanism that allows the first and second plate to be reversibly opened and closed can be suitable, for example, a hinge and a clasp.

Figure 5B:
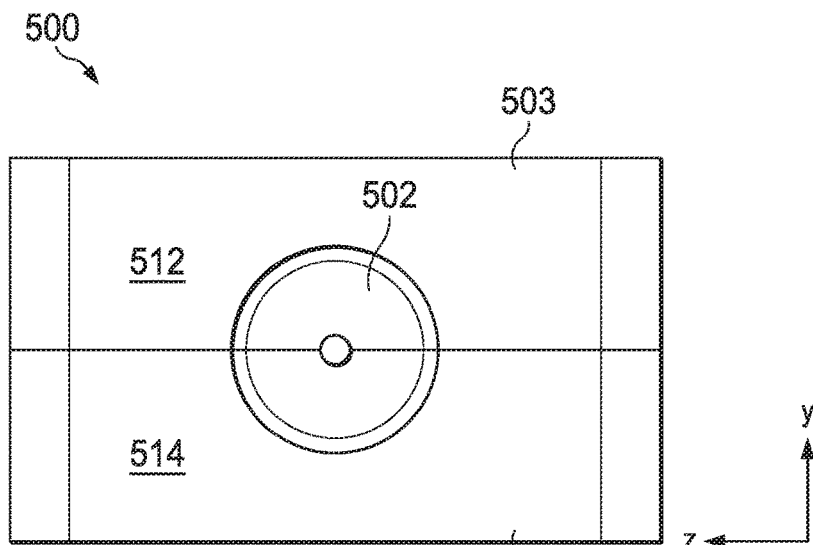
FIG. 5B shows an example of a front view of a second implementation of an apparatus.
Figure 5C:
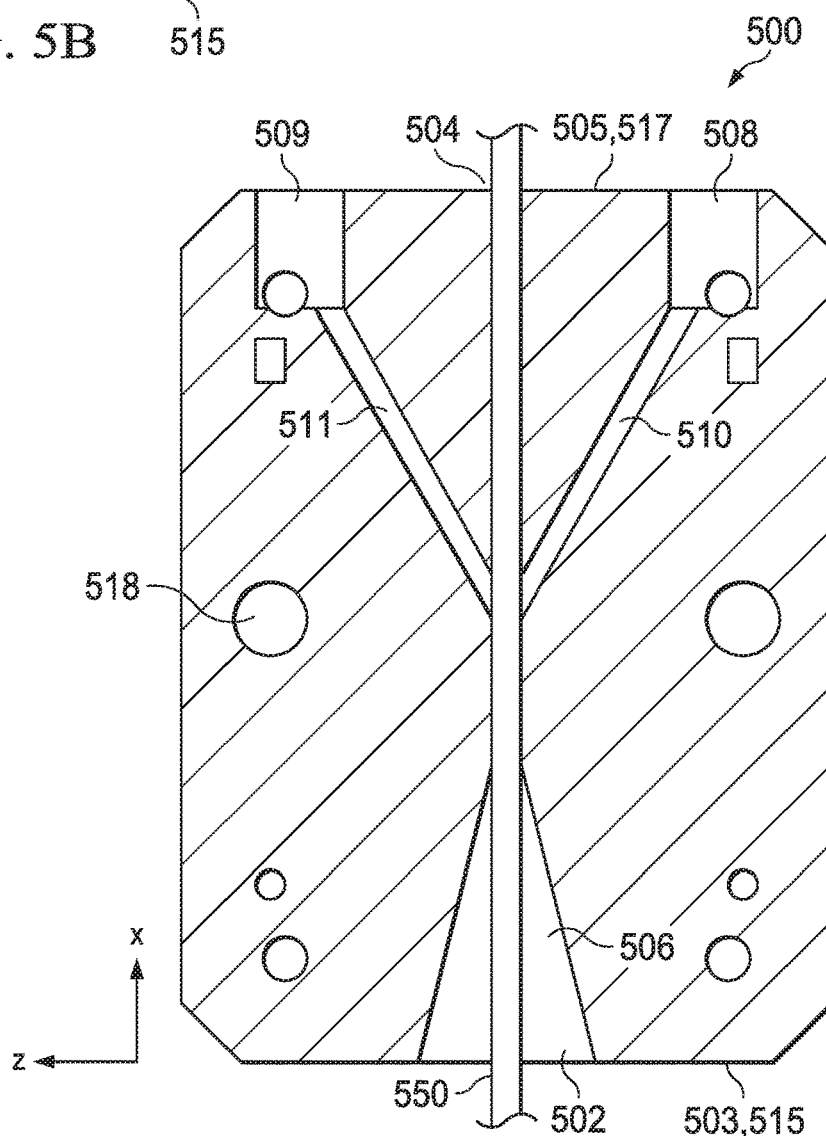
FIG. 5C shows an example of a cross-sectional top view of a second implementation of an apparatus.
Figure 5D:
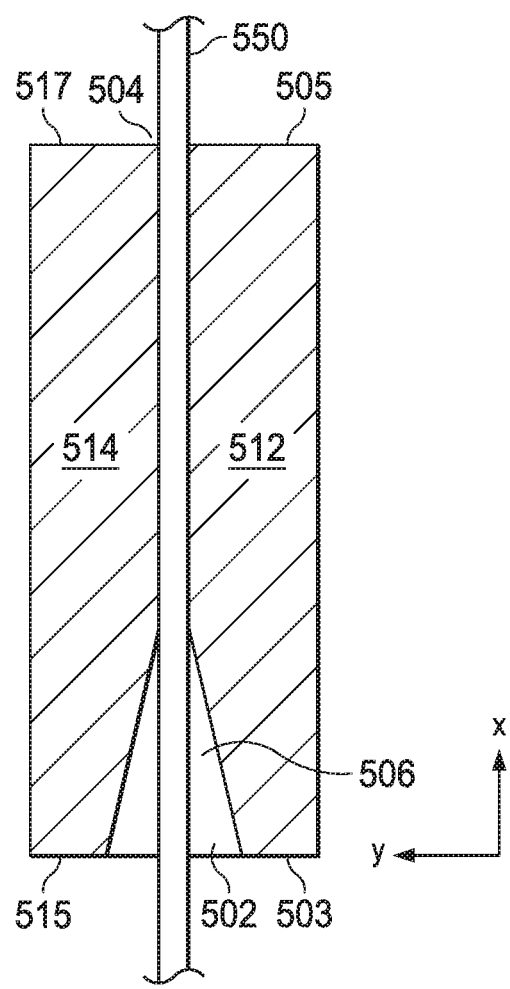
FIG. 5D shows an example of a cross-sectional side view of a second implementation of an apparatus.

The first surface 503 of the first plate 512 can define at least a portion of the inlet 502, and the first surface 515 of the second plate 512 can define the remainder of the inlet 502 (FIGS. 5A, 5D). The second surface 505 of the first plate 512 can define at least a portion of the outlet 504, and the second surface 517 of the second plate 514 can define the remainder of the outlet 504 (FIGS. 5A, 5D). A first hollow passage 506 connects the inlet and the outlet (FIGS. 5C, 5D). The first plate 512 can define a first portion of the first hollow passage 506 and the second plate 514 can define a second portion of the first hollow passage 506. Accordingly, in some implementations the hollow passage is formed when the first and second plates are joined together (FIG. 5D). The inlet 502, outlet 504, and first hollow passage 506 can be sufficiently large to allow a hollow fiber to pass through the apparatus 500 without coming into contact with the sides of the first hollow passage 506. The inlet 502, outlet 504, and the first hollow passage 506 can have any cross-sectional shape that can accommodate the hollow fiber. For example, the inlet, outlet, and first hollow passage can have a triangular, rectangular, star-shaped or substantially circular passage. The inlet, outlet, and first hollow passage can have, for example, a diameter of 0.5 to 10 mm. Alternatively, the inlet, outlet, and first hollow passage can have, for example, a diameter of 0.5 to 2.0 mm. Further, the inlet, outlet, and first hollow passage can be configured to accommodate the desired hollow fiber. For example, high pressure applications require thin film composite hollow fiber membranes that are thin enough to withstand operating pressures. A hollow microfiber with a diameter of 80 μm can be used for high-pressure applications such as gas separation, reverse osmosis, or nanofiltration. Alternatively, low pressure applications such as microfiltration or ultrafiltration require thicker thin film composite hollow fiber membranes in order to minimize pressure drop through the bore of the fiber. A hollow fiber with a diameter of 1.5 mm can be used for ultrafiltration or microfiltration. Accordingly, the inlet, outlet, and first hollow passage can be configured to these or other hollow fiber diameters. In some implementations, the diameter of the inlet, outlet, and first hollow passage can be between 150%-200% wider than the diameter of the hollow fiber.

FIG. 5B shows an example of a front view of an apparatus 500 with plate 512 and 514. Both the first plate 512 and the second plate 514 can have a substantially rectangular cross-section. The substantially rectangular cross-section allows the hollow fiber to pass through the apparatus 500. In some implementations, the first plate 512 can define at least a portion of the inlet 502 and the outlet 504, and the second plate 514 can define a remainder of the inlet 502 and the outlet 504 (FIGS. 5B, 5D). The first plate 512 and second plate 514 can define a first hollow passage 506 as described previously.

FIG. 5C shows an example of a cross-sectional top view of an apparatus 500. The first hollow passage 506 can be configured to allow a hollow fiber to pass through the apparatus 500 in a direction from the inlet to the outlet as described previously. The apparatus 500 can include a first compressed gas port 508 and a second compressed gas port 510 formed on the housing 501. In some implementations, the first and second compressed gas ports are formed on the second plate 514. In some implementations, the first and second compressed gas ports are formed on the second surface 515 adjacent to the outlet 504. The first and second gas ports are configured to be connected to one or more compressed gas sources.

The housing 501 can define a second hollow passage 510 between the first compressed gas port 508 and the first hollow passage 506. The housing 501 can define a third hollow passage 511 between the second compressed gas port 509 and the first hollow passage 506. In some implementations, the second plate 514 can define the first and second compressed gas ports and the second and third hollow passages. In some implementations, the second hollow passage 510 and the third hollow passage 511 share a common outlet to the first hollow passage. The common outlet can be positioned substantially at a mid-point of the first hollow passage 506.

The first and second compressed gas ports 508 and 509 can be configured to flow compressed gas through the second and third hollow passages 510 and 511 in a direction toward the inlet 502, in a direction that is at least partially opposite to the movement of the hollow fiber through the apparatus 500. The angle of the second and third hollow passages, relative to the first hollow passage, can be configured in order that the movement of compressed air through the second and third hollow passages removes at least a portion of the first solution (that is, the excess first solution) from an outer surface of the hollow fiber. The second and third hollow passages 510 and 511 are positioned symmetrically on substantially opposite sides of the first hollow passage 506.

The rate at which the compressed gas flows over the hollow fiber is determined by a quantity of the excess first solution on the outer surface of the hollow fiber. The flow rate of the compressed gas can be optimized, for example by optimizing for the diameter of the first hollow passage, the length of the first hollow passage, or the diameter of the hollow fiber. In some implementations, the flow rate of the compressed gas is controlled by a pressure regulator, a needle valve, a mass flow meter, or a combination of a pressure regulator and needle valve or mass flow meter. In some implementations, the compressed gas is compressed ambient air. In some implementations, the compressed gas is an inert gas, for example, nitrogen. Removing the excess first solution improves the quality of the membrane that results from interfacial polymerization. For example, excess first solution on the hollow fiber causes defects in the membrane. Accordingly, removing the excess first solution improves the quality and subsequent performance of the membrane.

In an alternative embodiment, the inlet 502, outlet 504, first hollow passage 506, first compressed gas port 508, second compressed gas port 509, second hollow passage 510 and third hollow passage 511 can be defined by the first plate 512. In another alternative embodiment, the inlet 502, outlet 504, first hollow passage 506, first compressed gas port 508, second compressed gas port 509, second hollow passage 510, and third hollow passage 511 can be defined by the second plate 514. The second hollow passage 510 and third hollow passage 511 are configured for the movement of air or gas through the second and third hollow passages. The hollow fiber 550 does not pass through the second hollow passage 510 or the third hollow passage 511.

In some implementations, the device 500 contains additional compressed gas ports and additional hollow passages. The additional compressed gas ports and additional hollow passages can be positioned as pairs, symmetrically on substantially opposite sides of the first hollow passage 506.

Figure 6:
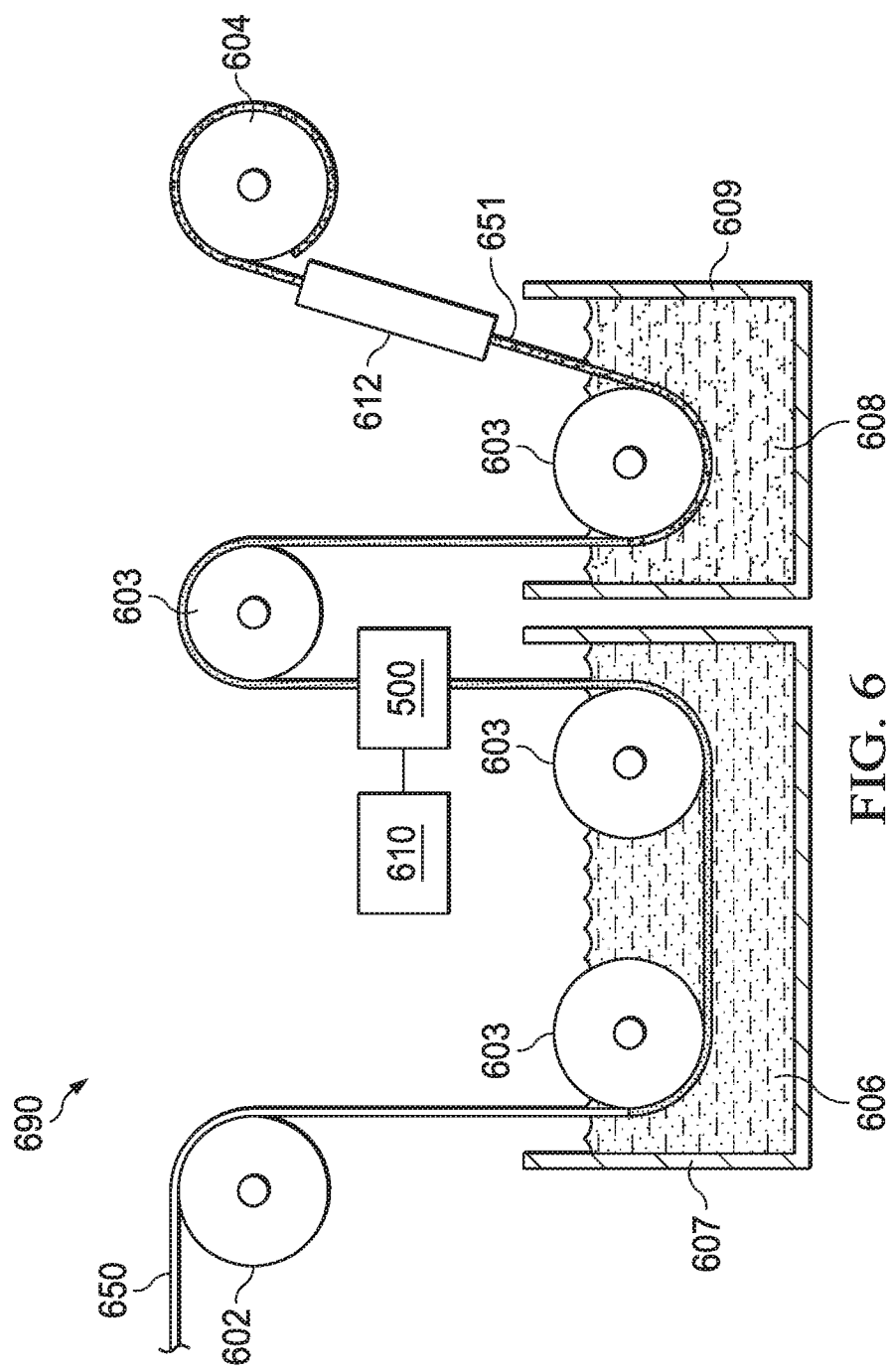
FIG. 6 shows an example of a system configured to produce thin film composite hollow fiber membranes using a second implementation of an apparatus.

FIG. 6 shows an example of a system 690 configured to produce thin film composite hollow fiber membranes using an apparatus. In some implementations, the apparatus 500 can be part of a system 690 for producing a thin film composite on the outer surface of a hollow fiber. The system can include a hollow fiber 650 that can travel between two bobbins 602 and 604 over a series of rollers 603. The hollow fiber 650 can be a semi-permeable hollow fiber. The hollow fiber can be wound around the first bobbin 602 to create a spool of hollow fiber. The hollow fiber 650 can then unspool from the first bobbin 602 and travel the series of rollers 603. The rollers are positioned to direct the hollow fiber 650 into a first solution 606, in order to saturate or coat the hollow fiber 650 with the first solution 606. The first solution 606 can be held in a first reservoir 607. The first solution can be an aqueous solution containing monomeric arylene polyamine, for example, an aqueous solution of 1,3-phenylenediamine. The hollow fiber then passes through the apparatus 500. A compressed gas source 610 is connected to the apparatus 500 via the compressed gas ports. In some implementations, more than one compressed gas source is connected to the apparatus 500 via the first and second compressed gas ports. For example, a first compressed gas source can be connected to the first compressed gas port 508 and a second compressed gas source can be connected to the second compressed gas port 509. Alternative, a first compressed gas source can be connected to both the first compressed gas port 508 and the second compressed gas port 509. The apparatus 500 and the compressed gas source or sources 610 remove the excess first solution from the hollow fiber 650. The hollow fiber can then be immersed in a second solution 608. The second solution can be held in a second reservoir 609. The second solution can be a water immiscible solvent containing monomeric acyl halide, for example, a solution of trimesoyl chloride in n-hexane. After immersing in the second solution, the hollow fiber includes a thin film composite on the outer surface of the membrane, forming a thin film composite hollow fiber membrane 651. The thin film composite hollow fiber membrane 651 then passes through an air drying tower 612. The air drying tower 612 is configured to evaporate unreacted second solution and thermally cure the formed composite membrane. The air drying tower 612 can include a heat gun or a dryer. The heat supplied by the air drying tower 612 can reach temperatures of 150° C. to dry and cure the thin film composite hollow fiber membrane. The thin film composite hollow fiber membrane 651 can then travel to a second bobbin 604 configured to receive the thin film composite hollow fiber membrane 651. The thin film composite hollow fiber membrane 651 can be wound around the second bobbin 604.

The system can include a motor to drive the movement of the hollow fiber, for example, by driving the rotation of the bobbins, the rollers, or a combination of the bobbins and rollers. In some implementations, the second bobbin 604 is connected to a motor and set to a speed that allows for removal of the excess first solution 606 as well as drying of the thin film composite hollow fiber membrane 651. In some implementations, the rotation of bobbin 602 is dependently controlled by a tension controller. Accordingly, the system 690 allows for the formation of a thin film membrane along a continuously moving hollow fiber, thus improving efficiency and creating long, continuous membranes. In addition, unlike systems that configure nip-rollers to remove excess first solution, a system that uses the apparatus 500 can be configured to remove excess first solution from a hollow fiber and to produce thin film composite hollow fiber membranes, without pressing or damaging the hollow fiber.

Figure 7:
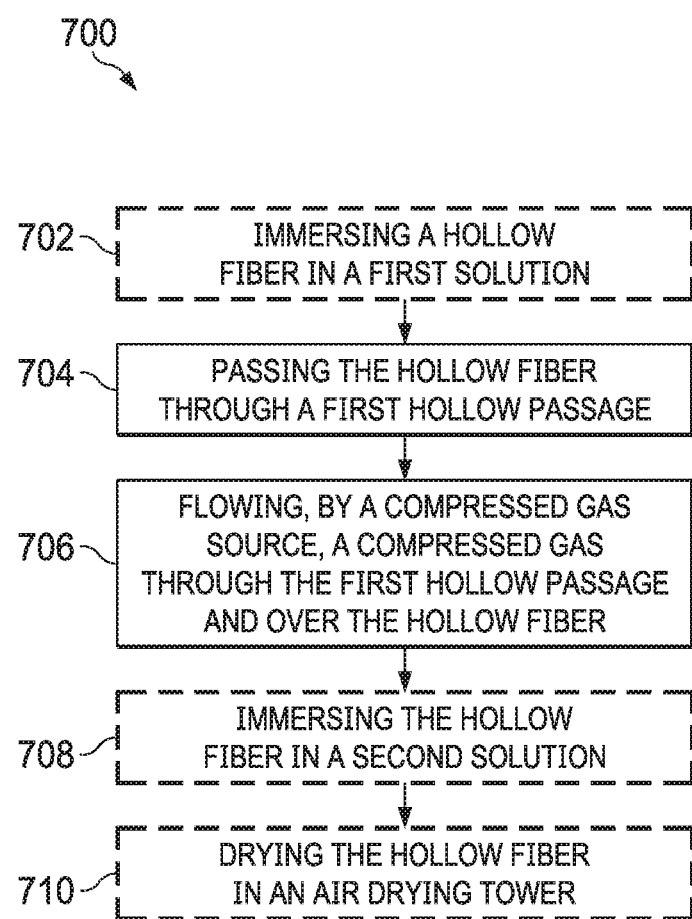
FIG. 7 is a flowchart showing an example method of producing thin film composite hollow fiber membranes using a second implementation of an apparatus.

FIG. 7 is a flowchart showing an example method of producing thin film composite hollow fiber membranes using a second implementation of an apparatus. In some implementations, a method 700 includes immersing a hollow fiber in a first solution at 702. The first solution can be an aqueous solution containing monomeric arylene polyamine, for example, an aqueous solution of 1,3-phenylenediamine. At 704, a hollow fiber is passed through a first hollow passage defined by a housing between an inlet formed on a first surface of the housing and an outlet formed on a second surface of the housing opposite the first surface.

At 706, a compressed gas source flows a compressed gas through the gas ports, through a second hollow passage and a third hollow passage defined by the housing, and through the first hollow passage. In the first hollow passage the compressed gas flows over the hollow fiber. The compressed gas can be flowed toward the inlet in a direction at least partially opposite a direction that the hollow fiber passes through the apparatus. Doing so removes at least a portion of the first solution (that is, the excess first solution) from an outer surface of the hollow fiber. A rate at which the gas flows over the hollow fiber is determined by a quantity of the excess first solution on the outer surface of the hollow fiber. In some implementations, the gas is compressed ambient air or a compressed inert gas, such as nitrogen.

In some implementations, after passing the hollow fiber through the outlet, the method can include immersing the hollow fiber in a second solution at 708. The first and second solution can be immiscible, and contact between the first solution on the hollow fiber and the second solution can cause a polymerization reaction at an interface of the first solution and the second solution. In some implementations, the first solution is an aqueous solution containing monomeric arylene polyamine, for example, an aqueous solution of 1,3-phenylenediamine. In some implementations, the second solution is a water immiscible solvent containing monomeric acyl halide, for example, trimesoyl chloride in n-hexane.

In some implementations, at 710 the hollow fiber can be dried in an air drying tower. The air drying tower 612 is configured to evaporate unreacted second solution and thermally cure the formed composite membrane. The air drying tower 612 can include a heat gun or a dryer. The heat supplied by the air drying tower 612 can reach temperatures of 150° C. to dry and cure the thin film composite hollow fiber membrane.

Figure 8A:
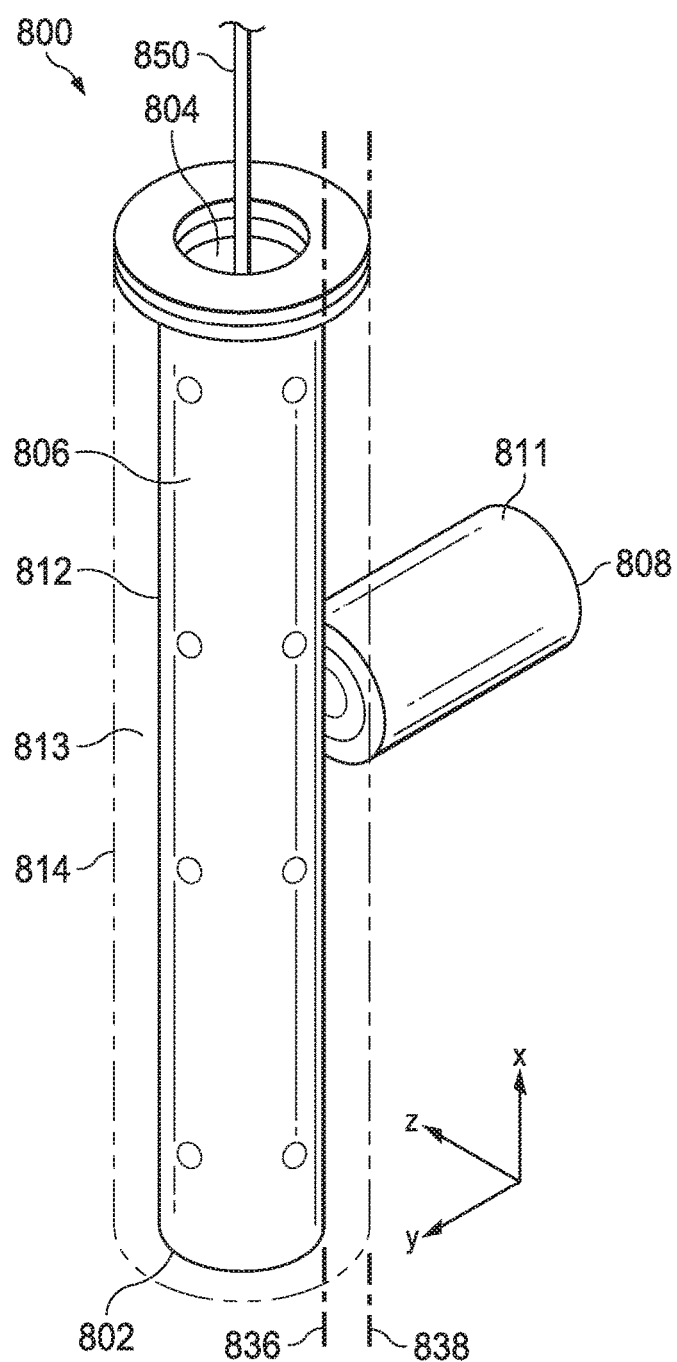
FIG. 8A shows an example of a third implementation of an apparatus.

FIG. 8A shows an example of a third implementation of an apparatus 800. In some implementations, an apparatus 800 can include a first tubular member 812 and a second tubular member 814. The second tubular member 814 can be positioned coaxially within the first tubular member 812. In some implementations, a longitudinal axis of the first tubular member 836 and a longitudinal axis of the second tubular member 838 are substantially parallel to each other.

The first and second tubular members can comprise metal or plastic, for example, polytetrafluoroethylene, polyethylene, polypropylene, or acrylic. The inner surface of the second tubular member 814 defines a first hollow passage 806. A hollow fiber that has been immersed in a first solution (for example, the first solution 102 of FIG. 1) is passed through the apparatus 800 from an inlet 802 toward an outlet 804 via the first hollow passage 806.

The first tubular member and second tubular member define an annular region 813 between an inner surface of the first tubular member and an outer surface of the circumferential wall of the second tubular member. The annular region can be sealed except for a gas inlet port 808 and apertures 803, as discussed below. The first tubular member can be fluidly coupled to a compressed gas inlet port 808. In some implementations, a third tubular member 811 is attached to the first tubular member, wherein a first end of the third tubular member 811 is fluidly coupled to a circumferential surface of the first tubular member 812, and the compressed gas inlet port 808 is formed on a second end of the third tubular member 811. In some implementations, the third tubular member is attached to the first tubular member at a point substantially midway between ends of the first tubular member. The compressed gas inlet port 808 is configured to be coupled to a compressed gas source. Accordingly, compressed gas can flow from the compressed gas port 808, through the third tubular member 811, and into the annular space 813.

Figure 8B:
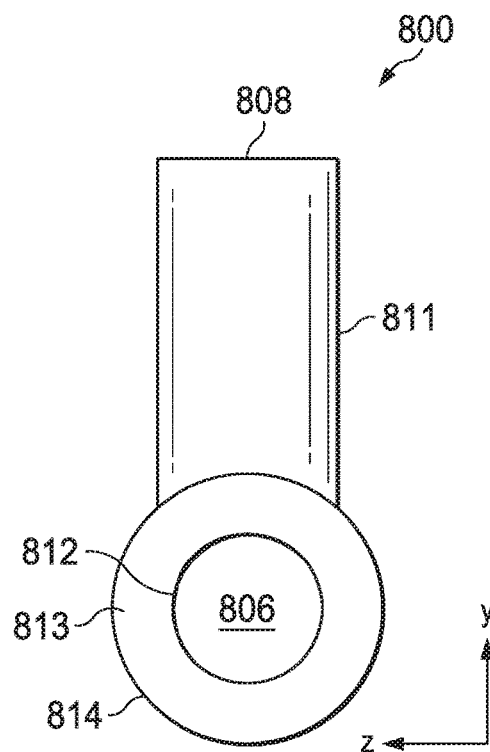
FIG. 8B shows an example of a top view of a third implementation of an apparatus.

FIG. 8B shows an example of a top view of the apparatus 800. As discussed previously, the first tubular member 812 and the second tubular member 814 can enclose an annular region 813. The second tubular member 814 can define a first hollow space 806. The hollow space 806 can be configured to allow a hollow fiber 850 to pass through the apparatus 800 (FIG. 8A). The inlet 802, outlet 804, and first hollow passage 806 can be sufficiently large to allow a hollow fiber to pass through the apparatus 800 without coming into contact with the sides of the first hollow passage 806. The inlet 802, outlet 804, and first hollow passage 806 can have any cross-sectional shape that can accommodate the hollow fiber. For example, the inlet, outlet, and first hollow passage can have a triangular, rectangular, star-shaped or substantially circular passage. The inlet, outlet, and first hollow passage can have, for example, a diameter of 0.5 to 10 mm. Alternatively, the inlet, outlet, and first hollow passage can have, for example, a diameter of 0.5 to 2.0 mm. Further, the inlet, outlet, and first hollow passage can be configured to accommodate the desired hollow fiber. For example, high pressure applications require thin film composite hollow fiber membranes that are thin enough to withstand operating pressures. A hollow microfiber with a diameter of 80 µm can be used for high-pressure applications such as gas separation, reverse osmosis, or nanofiltration. Alternatively, low pressure applications such as microfiltration or ultrafiltration require thicker thin film composite hollow fiber membranes in order to minimize pressure drop through the bore of the fiber. A hollow fiber with a diameter of 1.5 mm can be used for ultrafiltration or microfiltration. Accordingly, the inlet, outlet, and first hollow passage can be configured to these or other hollow fiber diameters. In some implementations, the diameter of the inlet, outlet, and first hollow passage can be between 150%-200% wider than the diameter of the hollow fiber.

Figure 8C:
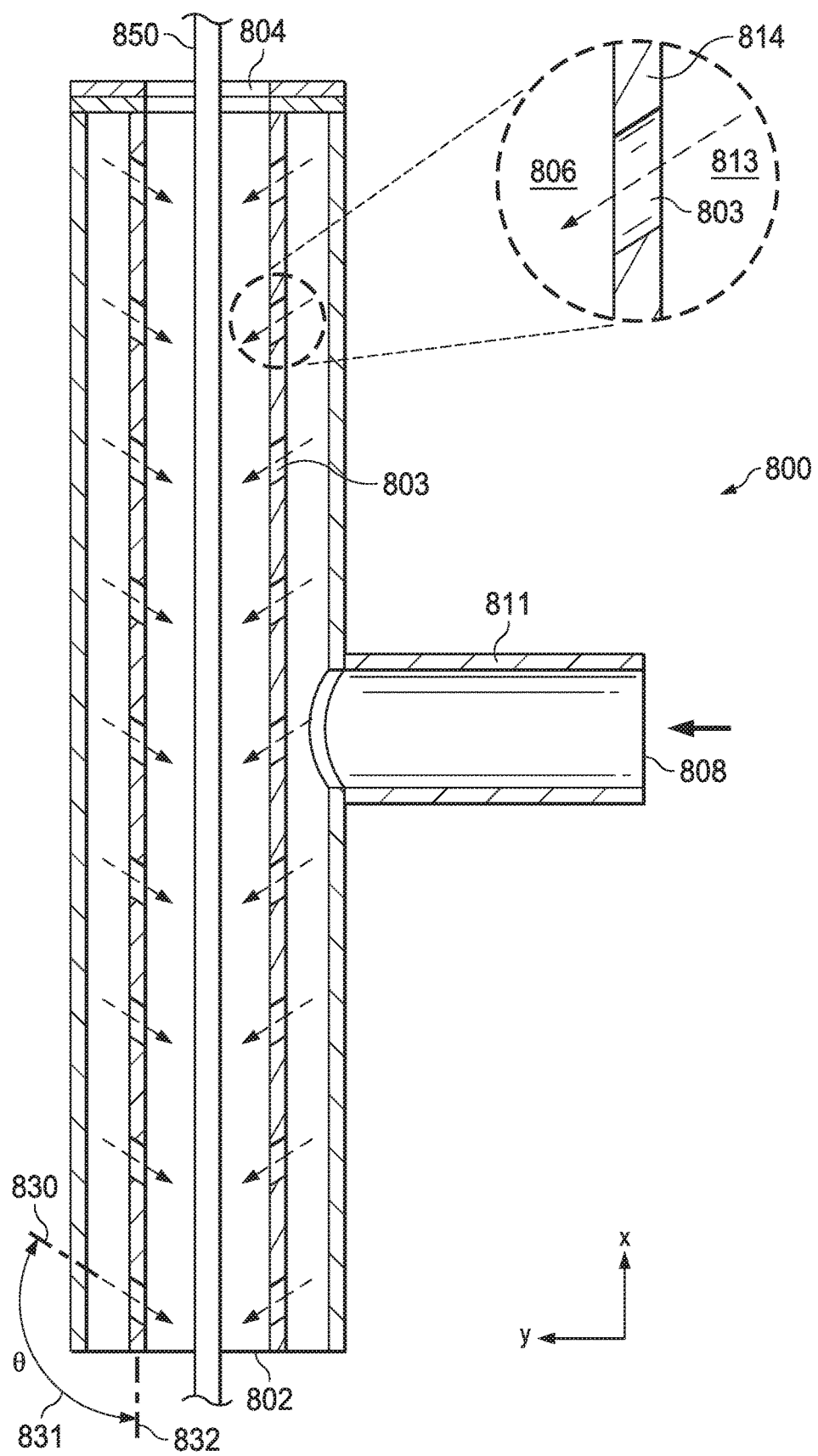
FIG. 8C shows an example of a cross-sectional side view of a third implementation of an apparatus.

FIG. 8C shows an example of a cross-sectional side view of an apparatus 800. The second tubular member 814 can include a circumferential wall that has multiple apertures 803, which are through-holes in the circumferential wall of the second tubular member 814. The apertures can be distributed at multiple positions around the circumference of the second tubular member and at multiple positions along the x-axis (FIG. 8C). This allows the compressed air that is flowed into the annular space to be flowed at multiple angles and locations relative to the surface of the hollow fiber. In some implementations, the apertures substantially surround the hollow fiber as it passes through the apparatus 800.

A compressed gas source connected to the compressed gas port 808 can flow compressed air through the third tubular member 811, into the annular space 813, and through the multiple aperture 803 into the first hollow passage 806. In some implementations, the compressed gas is compressed ambient air. In some implementations, the compressed gas is an inert gas, for example, nitrogen.

The apertures 803 can be configured such that the compressed gas can flow through the first hollow passage 806 in a direction that is at least partially opposite to the movement of the hollow fiber 850 through the apparatus 800. Each aperture 803 can have an axis 830 that forms an angle 831, relative to an axis of the second tubular member 832. Accordingly, the angle 831 is configured to flow the compressed gas over the hollow fiber 850 in a direction at least partially opposite to a direction in which the hollow fiber is passed through the hollow portion 806 of the second tubular member 814. In some implementations, the angle 831 is greater than zero degrees and less than ninety degrees. In some implementations, the angle is substantially 45 degrees. In some implementations, the angles 831 for the multiple apertures are equal to each other. In some implementations, the angles 831 for the multiple apertures are different from each other.

Flowing gas through the apertures 803 removes at least a portion of the first solution (that is, the excess first solution) from an outer surface of the hollow fiber. The rate at which the compressed gas flows over the hollow fiber is determined by a quantity of the excess first solution on the outer surface of the hollow fiber. Removing the excess first solution improves the quality of the membrane that results from interfacial polymerization. For example, excess first solution on the hollow fiber causes defects in the membrane. Accordingly, removing the excess first solution improves the quality and subsequent performance of the membrane. The flow rate of the compressed gas can be optimized, for example by optimizing for the diameter of the first hollow passage, the length of the first hollow passage, or the diameter of the hollow fiber. In some implementations, the flow rate of the compressed gas is controlled by a pressure regulator, a needle valve, a mass flow meter, or a combination of a pressure regulator and needle valve or mass flow meter.

Figure 9:
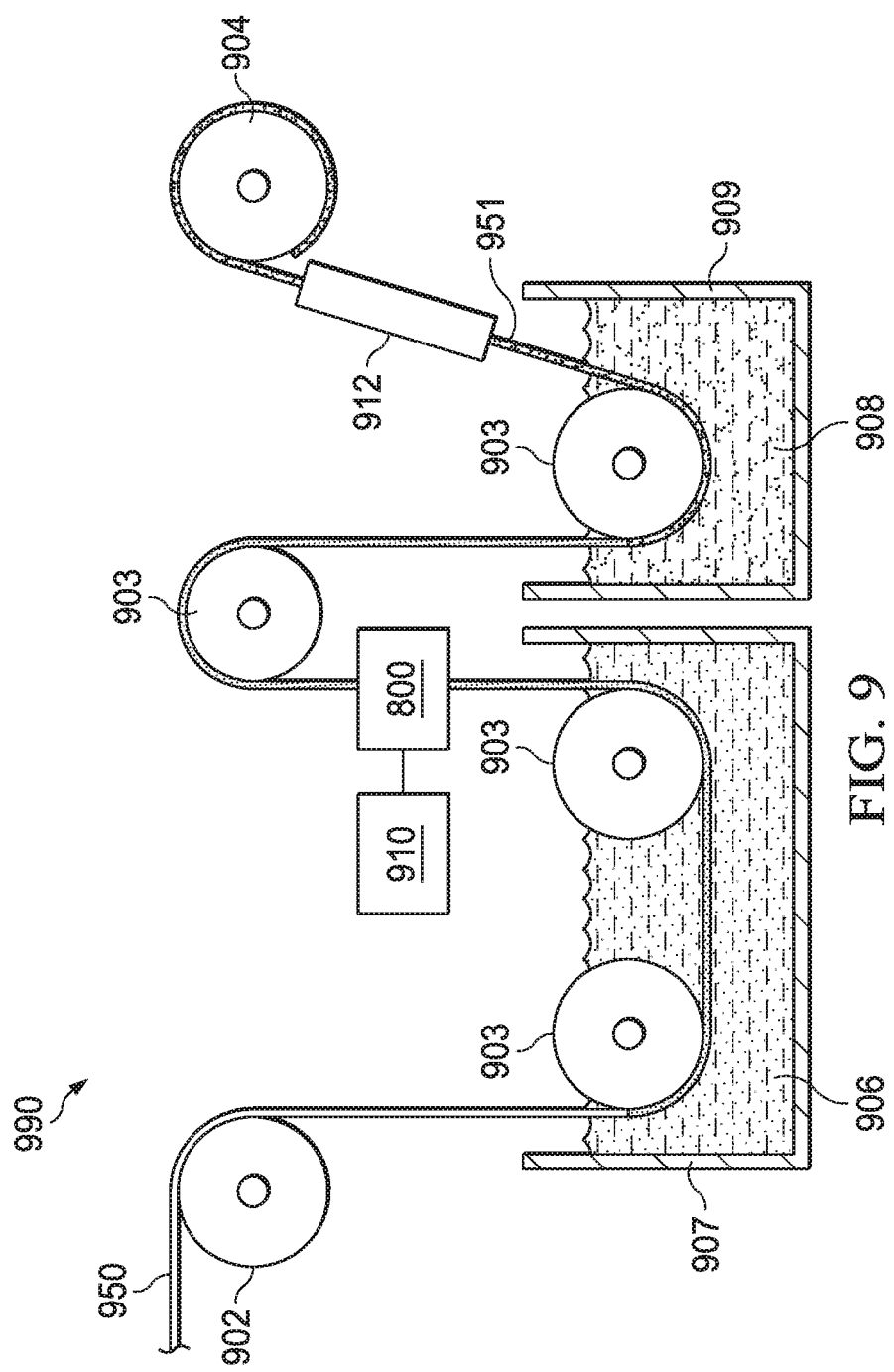
FIG. 9 shows an example of a system configured to produce thin film composite hollow fiber membranes using an apparatus.

FIG. 9 shows an example of a system 990 configured to produce thin film composite hollow fiber membranes using an apparatus. In some implementations, the apparatus 800 can be part of a system 990 for producing a thin film composite on the outer surface of a hollow fiber membrane. The system can include a hollow fiber 950 that can travel between two bobbins 902 and 904 over a series of rollers 903. The rollers are positioned to direct the hollow fiber 950 into a first solution 906, in order to saturate or coat the hollow fiber 950 with the first solution 906. The first solution 906 can be held in a first reservoir 907. The first solution can be an aqueous solution containing monomeric arylene polyamine, for example, an aqueous solution of 1,3-phenylenediamine. The hollow fiber then passes through the apparatus 800. A compressed gas source 910 is connected to the apparatus 800 via the compressed gas port 808. The apparatus 800 and the compressed gas source 910 remove the excess first solution from the hollow fiber 950. The hollow fiber can then be immersed in a second solution 808. The second solution can be held in a second reservoir 809. The second solution can be a water immiscible solvent containing monomeric acyl halide, for example, a solution of trimesoyl chloride in n-hexane. After immersing in the second solution, the hollow fiber includes a thin film composite on the outer surface of the membrane, forming a thin film composite hollow fiber membrane 951. The thin film composite hollow fiber membrane 951 then passes through an air drying tower 912. The air drying tower 912 is configured to evaporate unreacted second solution and to thermally cure the formed composite membrane. The air drying tower 912 can include a heat gun or a dryer. The heat supplied by the air drying tower 912 can reach temperatures of 150° C. to dry and cure the thin film composite hollow fiber membrane. The thin film composite hollow fiber membrane 951 can then travel to a second bobbin 904 configured to receive the thin film composite hollow fiber membrane 951. The thin film composite hollow fiber membrane 951 can be wound around the second bobbin 904. In some implementations, the second bobbin 904 is connected to a controlled-speed motor and set to a speed that allows for removal of the excess first solution 906 as well as drying of the thin film composite hollow fiber membrane 951. In some implementations, the rotation of bobbin 902 is dependently controlled by a tension controller.

The system can include a motor to drive the movement of the hollow fiber, for example, by driving the rotation of the bobbins, the rollers, or a combination of the bobbins and rollers. Accordingly, the system 990 allows for the formation of a thin film membrane along a continuously moving hollow fiber, thus improving efficiency and creating long, continuous membranes. In addition, unlike systems that configure nip-rollers to remove excess first solution, a system that uses the apparatus 800 can be configured to remove excess first solution from a hollow fiber and to produce thin film composite hollow fiber membranes, without pressing or damaging the hollow fiber.

All three of the systems (390, 690, and 990) can use any of the apparatus 200, 500, and 800 interchangeably. In addition, all three systems can utilize more than one type or more than once instance of any of the three apparatuses 200, 500, and 800. A system can include multiple apparatuses in series, for example a system configured so that after the hollow fiber is immersed in the first solution, the hollow fiber passes through a first apparatus and into a second apparatus. The first and second apparatus can be the same apparatus or different apparatuses from the group including apparatuses 200, 500, and 800. The number of apparatus that can be utilized in series is not limited to one or two. Accordingly, many combinations of apparatuses are possible.

Figure 10:
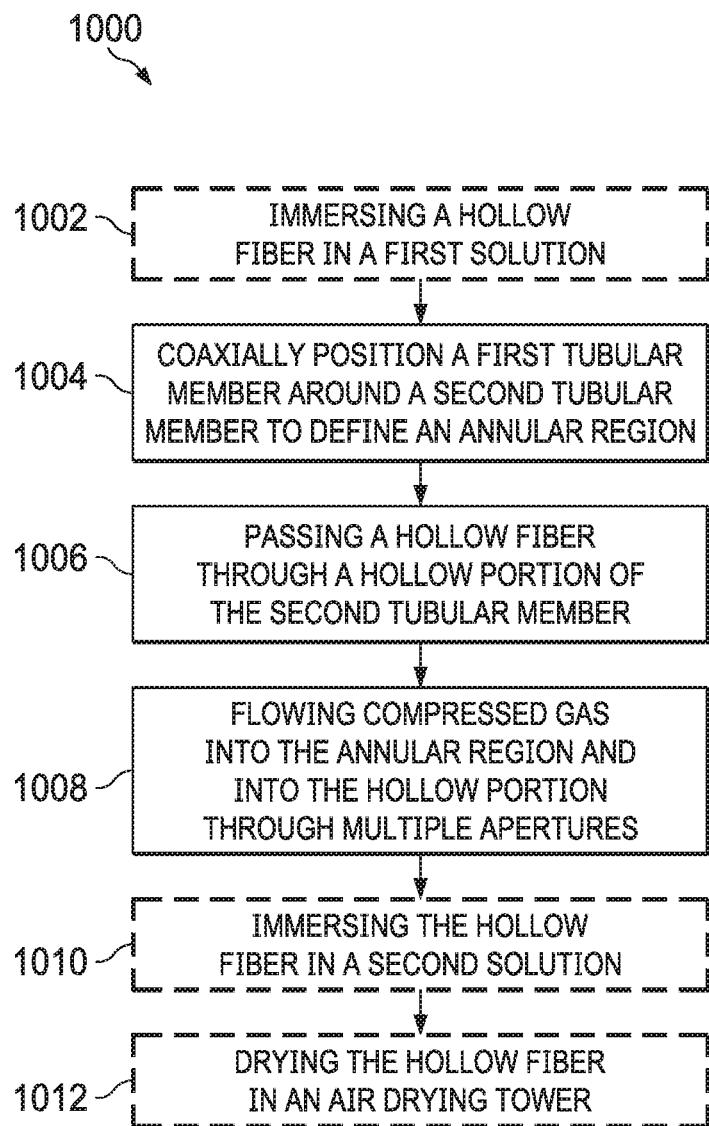
FIG. 10 is a flowchart showing an example method of producing thin film composite hollow fiber membranes.

FIG. 10 is a flowchart showing an example method of producing thin film composite hollow fiber membranes. In some implementations, a method 1000 includes immersing a hollow fiber in a first solution at 1002. The first solution can be an aqueous solution containing monomeric arylene polyamine, for example, an aqueous solution of 1,3-phenylenediamine. At 1004, a first tubular member is positioned around a second tubular member to define an annular region. At 1006, a hollow fiber is passed through a hollow portion of the second tubular member from a first end of the second tubular member toward a second end of the second tubular member.

At 1008, compressed gas is flowed into the annular region and into the hollow portion through multiple apertures formed on a circumferential wall of the second tubular member in a direction at least partially opposite to the direction in which the hollow fiber is passed through the second tubular member. Flowing the compressed gas over the hollow fiber removes at least a portion of the first solution (that is, the excess first solution) from an outer surface of the hollow fiber. A rate at which the gas flows over the hollow fiber is determined by a quantity of the excess first solution on the outer surface of the hollow fiber. In some implementations, the gas is compressed ambient air or a compressed inert gas, such as nitrogen.

In some implementations, after passing the hollow fiber through the second tubular member, the hollow fiber is immersed in a second solution at 1010. The first and second solution can be immiscible, and contact between the first solution on the hollow fiber and the second solution causes a polymerization reaction at an interface of the first solution and the second solution. In some implementations, the first solution is an aqueous solution containing monomeric arylene polyamine, for example, an aqueous solution of 1,3-phenylenediamine. In some implementations, the second solution is a water immiscible solution containing monomeric acyl halide, for example, a solution of trimesoyl chloride in n-hexane.

In some implementations, at 1012, after immersing the hollow fiber in a second solution, the hollow fiber is dried in an air drying tower. The air drying tower 1012 is configured to evaporate unreacted second solution and thermally cure the formed composite membrane. The air drying tower 1012 can include a heat gun or a dryer. The heat supplied by the air drying tower 1012 can reach temperatures of 150° C. to dry and cure the thin film composite hollow fiber membrane.

Examples Preparation of a thin film membrane using an apparatus 500 A mesoporous hollow fiber with 20-100 nm pores and a surface porosity of 8-20% was partially immersed into a first solution of 0.5-2.5 wt % m-PDA for 10 minutes to saturate the hollow fiber with the first solution. Excess first solution was removed from the hollow fiber using an apparatus 500. The droplet-free porous hollow fiber was next immersed in a second solution of 0.05-0.2 wt/vol % trimesoyl chloride in n-hexane to generate the thin film composite membrane on the outer surface of the hollow fiber. The hollow fiber with thin film composite membrane was then dried in an air drying tower and collected on a bobbin. Gas permeation results indicate that the prepared membrane has selectivity for helium over other gases, for example, $CO_2$ (Table 1). Each of three experiments was a pure gas permeation test with a feed pressure of 100 psi over a membrane area of 65.4 $cm^2$.

TABLE 1

| Experiment number | Gas Permeance | | | | | | |
| --- | --- | --- | --- | --- | --- | --- | --- |
| | Permeance (Gas Permeance Unit) | | | | Selectivity | | |
| | He | $N_2$ | $CH_4$ | $CO_2$ | He/$N_2$ | He/$CH_4$ | He/$CO_2$ |
| 1 | 15.26 | 0.02 | 0.01 | 0.40 | 837.8 | 1148.1 | 38.3 |
| 2 | 15.36 | 0.01 | 0.01 | 0.43 | 1200.0 | 1733.3 | 35.5 |
| 3 | 14.96 | 0.02 | 0.01 | 0.40 | 980.6 | 2338.5 | 37.5 |

A number of implementations of the disclosure have been described. Nevertheless, it will be understood that various modifications may be made without departing from the spirit and scope of the disclosure.

What is claimed is:

1. An apparatus comprising:
a housing;
an inlet formed on a first surface of the housing;
an outlet formed on a second surface of the housing opposite the first surface, the housing defining a first hollow passage between the inlet and the outlet, the first hollow passage configured to allow a hollow fiber to pass through the housing; and
a vacuum port formed on a third surface of the housing, the housing defining a second hollow passage between the first hollow passage and the vacuum port, the vacuum port configured to draw gas from the inlet and the outlet and through the first hollow passage and the second hollow passage, wherein the second hollow passage connects to the first hollow passage at a point substantially in the middle of the first hollow passage, and wherein
the housing comprises a first plate and a second plate configured to be joined together to form the housing,
the first plate comprising a first surface, the second plate comprising a first surface, the first surface of the first plate defining a portion of the inlet and the first surface of the second plate defining a remainder of the inlet,
the first plate comprising a second surface, the second plate comprising a second surface, the second surface of the second plate defining a portion of the outlet and the second surface of the second plate defining a remainder of the outlet, and
the first plate and the second plate are separably coupled by a coupling mechanism.

2. The apparatus of claim 1, wherein the third surface is substantially perpendicular to the first surface or the second surface.

3. The apparatus of claim 2, wherein the second hollow passage is substantially perpendicular to the first hollow passage.

4. The apparatus of claim 1, wherein the first plate defines at least a portion of the first hollow passage and the second plate defines a remainder of the first hollow passage.

5. The apparatus of claim 1, wherein the second plate defines the second hollow passage.

6. The apparatus of claim 1, wherein the coupling mechanism comprises a hinge or a magnet or a hinge and a magnet.

7. The apparatus of claim 1, wherein the first plate has a substantially rectangular cross-section and the second plate has a substantially T-shaped cross-section.

8. A system comprising:
an apparatus comprising:
a housing,
an inlet formed on a first surface of the housing,
an outlet formed on a second surface of the housing opposite the first surface, the housing defining a first hollow passage between the inlet and the outlet, the first hollow passage configured to allow a hollow fiber to pass through the housing, and
a vacuum port formed on a third surface of the housing, the housing defining a second hollow passage between the first hollow passage and the vacuum port, the vacuum port configured to draw gas from the inlet and the outlet and through the first hollow passage and the second hollow passage, wherein the second hollow passage connects to the first hollow passage at a point substantially in the middle of the first hollow passage, and wherein
the housing comprises a first plate and a second plate configured to be joined together to form the housing,
the first plate comprising a first surface, the second plate comprising a first surface, the first surface of the first plate defining a portion of the inlet and the first surface of the second plate defining a remainder of the inlet,
the first plate comprising a second surface, the second plate comprising a second surface, the second surface of the second plate defining a portion of the outlet and the second surface of the second plate defining a remainder of the outlet, and
the first plate and the second plate are separably coupled by a coupling mechanism;
a vacuum source coupled to the vacuum port, the vacuum source configured to apply vacuum to the vacuum port to draw the gas from the inlet and the outlet and through the first hollow passage and the second hollow passage.

9. The system of claim 8, wherein the first plate defines at least a portion of the first hollow passage and the second plate defines a remainder of the first hollow passage.

10. The system of claim 8, wherein the second plate defines the second hollow passage.

11. The system of claim 8, wherein the coupling mechanism comprises a hinge or a magnet or a hinge and a magnet.

12. A method comprising:
forming a first plate comprising a first surface and a second surface;
forming a portion of an inlet in the first surface of the first plate and a portion of an outlet in the second surface of the first plate;
forming a second plate comprising a first surface and a second surface;
forming a remainder of the inlet in the first surface of the second plate and a remainder of the outlet in the second surface of the second plate;
forming a vacuum port on a third surface of the second plate;
assembling the first plate and the second plate to form a housing, wherein the housing defines a first hollow passage between the inlet and the outlet and a second hollow passage between the first hollow passage and the vacuum port;
separably coupling the first plate and the second plate by a coupling mechanism;
passing a hollow fiber through the first hollow passage, wherein the hollow fiber is immersed in a first solution prior to passing the hollow fiber through the first hollow passage; and
while passing the hollow fiber through the first hollow passage, drawing, by vacuum, a gas through the first hollow passage and over the hollow fiber through a second hollow passage defined by the housing, the second hollow passage terminating in a vacuum port formed on a third surface of the housing, wherein drawing the gas over the hollow fiber removes at least a portion of the first solution from an outer surface of the hollow fiber.

13. The method of claim 12, further comprising, after passing the hollow fiber through the outlet, immersing the hollow fiber in a second solution, wherein the first solution and the second solution are immiscible, wherein contact between the first solution and the second solution causes a polymerization reaction at an interface of the first solution and the second solution.

14. The method of claim 13, wherein immersing the hollow fiber in a first solution comprises immersing the hollow fiber in an aqueous solution comprising monomeric arylene polyamine.

15. The method of claim 14, wherein immersing the hollow fiber in a second solution comprises immersing the hollow fiber in a solution comprising a monomeric acyl halide.

16. The method of claim 12, wherein drawing, by vacuum, the gas through the first hollow passage and over the hollow fiber through the second hollow passage comprises drawing the gas through the inlet and the outlet towards the vacuum port.

* * * * *